(12) United States Patent
Donnelly

(10) Patent No.: US 7,304,445 B2
(45) Date of Patent: Dec. 4, 2007

(54) LOCOMOTIVE POWER TRAIN ARCHITECTURE

(75) Inventor: Frank Wegner Donnelly, North Vancouver (CA)

(73) Assignee: Railpower Technologies Corp., Brossard, Quebec (CA)

( * ) Notice: Subject to any disclaimer, the term of this patent is extended or adjusted under 35 U.S.C. 154(b) by 55 days.

(21) Appl. No.: 11/200,881

(22) Filed: Aug. 9, 2005

(65) Prior Publication Data

US 2006/0061307 A1    Mar. 23, 2006

Related U.S. Application Data

(60) Provisional application No. 60/692,358, filed on Jun. 20, 2005, provisional application No. 60/618,632, filed on Oct. 13, 2004, provisional application No. 60/618,631, filed on Oct. 13, 2004, provisional application No. 60/616,173, filed on Oct. 4, 2004, provisional application No. 60/607,194, filed on Sep. 3, 2004, provisional application No. 60/600,330, filed on Aug. 9, 2004.

(51) Int. Cl.
  *H02P 1/54*     (2006.01)
  *H02P 5/00*     (2006.01)

(52) U.S. Cl. .................. 318/108; 318/139; 318/254; 180/65.2; 60/698

(58) Field of Classification Search .......... 318/139, 318/108, 140–149, 254; 105/50, 26.05; 290/4 R; 180/65.4, 65.2; 477/2, 15; 307/64, 67; 320/101; 323/207
See application file for complete search history.

(56) References Cited

U.S. PATENT DOCUMENTS

| | | | |
|---|---|---|---|
| 384,580 A | 6/1888 | Julien | |
| 744,187 A | 11/1903 | Gibbs | |
| 1,199,752 A | 10/1916 | Baker | |
| 1,377,087 A | 5/1921 | Manns | |
| 1,535,175 A | 4/1925 | Mancha | |
| 2,403,933 A | 4/1946 | Lillquist | |
| 2,472,924 A | 6/1949 | Schwendner | |
| 2,510,753 A | 6/1950 | Multhaup | |
| 2,704,813 A | 3/1955 | Stamm | |
| 3,169,733 A | 2/1965 | Barrett, Jr. | |
| 3,443,115 A | 5/1969 | Timmerman, Jr. | |
| 3,569,810 A | 3/1971 | Thiele | |
| 3,596,154 A | 7/1971 | Gurwicz et al. | |

(Continued)

FOREIGN PATENT DOCUMENTS

CA    1283472    10/1987

(Continued)

OTHER PUBLICATIONS

U.S. Appl. No. 11/131,917, Donnelly.

(Continued)

*Primary Examiner*—Paul Ip
(74) *Attorney, Agent, or Firm*—Oyen Wiggs Green & Mutala LLP

(57) ABSTRACT

The present invention is directed to a power control architecture for a vehicle, particularly a locomotive, in which a number of energy sources are connected to a common electrical bus and selectively provide energy to the bus based on the relationship between their respective output voltages and the bus voltage.

40 Claims, 12 Drawing Sheets

U.S. PATENT DOCUMENTS

| | | |
|---|---|---|
| 3,668,418 A | 6/1972 | Godard |
| 3,728,596 A | 4/1973 | Hermansson et al. |
| 3,737,745 A | 6/1973 | Chevaugeon et al. |
| 3,792,327 A | 2/1974 | Waldorf |
| 3,832,625 A | 8/1974 | Gyugyi |
| 3,898,937 A | 8/1975 | Johnson |
| 3,919,948 A | 11/1975 | Kademann |
| 3,930,189 A | 12/1975 | Smith |
| 3,970,160 A | 7/1976 | Nowick |
| 3,982,164 A | 9/1976 | de Buhr |
| 3,997,822 A | 12/1976 | Logston et al. |
| 4,035,698 A | 7/1977 | Soderberg |
| 4,070,562 A | 1/1978 | Kuno et al. |
| 4,075,538 A | 2/1978 | Plunkett |
| 4,090,577 A | 5/1978 | Moore |
| 4,095,147 A | 6/1978 | Mountz |
| 4,096,423 A | 6/1978 | Bailey et al. |
| 4,107,402 A | 8/1978 | Dougherty et al. |
| 4,152,758 A | 5/1979 | Bailey et al. |
| 4,199,037 A | 4/1980 | White |
| 4,204,143 A | 5/1980 | Coleman |
| 4,217,527 A | 8/1980 | Bourke et al. |
| 4,284,936 A | 8/1981 | Bailey et al. |
| 4,309,645 A | 1/1982 | De Villeneuve |
| 4,344,139 A | 8/1982 | Miller et al. |
| 4,347,569 A | 8/1982 | Allen, Jr. et al. |
| 4,369,397 A | 1/1983 | Read |
| 4,417,194 A | 11/1983 | Curtiss et al. |
| 4,423,362 A | 12/1983 | Konrad et al. |
| 4,471,276 A | 9/1984 | Cudlitz |
| 4,471,421 A | 9/1984 | Brown et al. |
| 4,495,449 A | 1/1985 | Black et al. |
| 4,498,016 A | 2/1985 | Earleson et al. |
| 4,523,134 A | 6/1985 | Kinoshita et al. |
| 4,644,232 A | 2/1987 | Nojiri et al. |
| 4,700,283 A | 10/1987 | Tsutsui et al. |
| 4,701,682 A | 10/1987 | Hirotsu et al. |
| 4,719,861 A | 1/1988 | Savage et al. |
| 4,799,161 A | 1/1989 | Hirotsu et al. |
| 4,896,090 A | 1/1990 | Balch et al. |
| 4,900,944 A | 2/1990 | Donnelly |
| 4,936,610 A | 6/1990 | Kumar et al. |
| 4,941,099 A | 7/1990 | Wood et al. |
| 4,944,539 A | 7/1990 | Kumar et al. |
| 4,950,964 A | 8/1990 | Evans |
| 4,961,151 A | 10/1990 | Early et al. |
| 5,129,328 A | 7/1992 | Donnelly |
| 5,199,912 A * | 4/1993 | Dade et al. ............... 440/6 |
| 5,212,431 A | 5/1993 | Origuchi et al. |
| 5,264,764 A | 11/1993 | Kuang |
| 5,281,900 A | 1/1994 | Park |
| 5,289,093 A | 2/1994 | Jobard |
| 5,306,972 A | 4/1994 | Hokanson et al. |
| 5,317,669 A | 5/1994 | Anderson et al. |
| 5,331,261 A | 7/1994 | Brown et al. |
| 5,332,630 A | 7/1994 | Hsu |
| 5,343,970 A | 9/1994 | Severinsky |
| 5,359,228 A | 10/1994 | Yoshida |
| 5,376,868 A | 12/1994 | Toyoda et al. |
| 5,392,716 A | 2/1995 | Orschek et al. |
| 5,424,948 A | 6/1995 | Jorday, Jr. |
| 5,428,538 A | 6/1995 | Ferri |
| 5,436,538 A | 7/1995 | Garvey et al. |
| 5,436,540 A | 7/1995 | Kumar |
| 5,436,548 A | 7/1995 | Thomas |
| 5,453,672 A | 9/1995 | Avitan |
| 5,480,220 A | 1/1996 | Kumar |
| 5,508,924 A | 4/1996 | Yamashita |
| 5,510,203 A | 4/1996 | Hamada et al. |
| 5,510,693 A | 4/1996 | Theobald |
| 5,511,749 A | 4/1996 | Horst et al. |
| 5,528,148 A | 6/1996 | Rogers |
| 5,564,795 A | 10/1996 | Engle |
| 5,568,023 A | 10/1996 | Grayer et al. |
| 5,580,677 A | 12/1996 | Morishita et al. |
| 5,580,685 A | 12/1996 | Schenk |
| 5,585,706 A | 12/1996 | Avitan |
| 5,589,743 A | 12/1996 | King |
| 5,610,499 A | 3/1997 | Rogers |
| 5,610,819 A | 3/1997 | Mann et al. |
| 5,629,567 A | 5/1997 | Kumar |
| 5,629,596 A | 5/1997 | Iijima et al. |
| 5,629,601 A | 5/1997 | Feldstein |
| 5,631,532 A | 5/1997 | Azuma et al. |
| 5,646,510 A | 7/1997 | Kumar |
| 5,659,240 A | 8/1997 | King |
| 5,661,378 A | 8/1997 | Hapeman |
| 5,677,610 A | 10/1997 | Tanamachi et al. |
| 5,685,507 A | 11/1997 | Horst et al. |
| 5,696,438 A | 12/1997 | Hamilton |
| 5,698,955 A | 12/1997 | Nii |
| 5,710,699 A | 1/1998 | King et al. |
| 5,735,215 A | 4/1998 | Tegeler |
| 5,751,137 A | 5/1998 | Kiuchi et al. |
| 5,765,656 A | 6/1998 | Weaver |
| 5,820,172 A | 10/1998 | Brigham et al. |
| 5,848,659 A * | 12/1998 | Karg et al. ............... 180/65.4 |
| 5,856,037 A | 1/1999 | Casale et al. |
| 5,898,281 A | 4/1999 | Bossoney et al. |
| 5,898,282 A | 4/1999 | Drozdz et al. |
| 5,939,861 A | 8/1999 | Joko et al. |
| 5,964,309 A | 10/1999 | Kimura et al. |
| 5,992,950 A | 11/1999 | Kumar et al. |
| 5,998,880 A | 12/1999 | Kumar |
| 6,012,011 A | 1/2000 | Johnson |
| 6,018,233 A * | 1/2000 | Glennon ..................... 322/22 |
| 6,021,251 A | 2/2000 | Hammer et al. |
| 6,023,137 A * | 2/2000 | Kumar et al. ............... 318/254 |
| 6,025,086 A | 2/2000 | Ching |
| 6,026,921 A * | 2/2000 | Aoyama et al. ............ 180/65.2 |
| 6,027,181 A | 2/2000 | Lewis et al. |
| 6,048,289 A * | 4/2000 | Hattori et al. ................ 477/15 |
| 6,082,834 A | 7/2000 | Kolbe et al. |
| 6,104,148 A | 8/2000 | Kumar et al. |
| 6,175,272 B1 | 1/2001 | Takita |
| 6,177,738 B1 * | 1/2001 | Hentunen et al. ............. 307/67 |
| 6,188,139 B1 * | 2/2001 | Thaxton et al. ............. 290/4 R |
| 6,208,097 B1 | 3/2001 | Reddy et al. |
| 6,211,646 B1 | 4/2001 | Kouzu et al. |
| 6,218,807 B1 | 4/2001 | Sakaue et al. |
| 6,274,998 B1 | 8/2001 | Kaneko et al. |
| 6,308,639 B1 | 10/2001 | Donnelly et al. |
| 6,331,365 B1 | 12/2001 | King |
| 6,359,346 B1 | 3/2002 | Kumar |
| 6,367,891 B1 | 4/2002 | Smith et al. |
| 6,371,573 B1 | 4/2002 | Goebels et al. |
| 6,384,489 B1 | 5/2002 | Bluemel et al. |
| 6,405,705 B1 | 6/2002 | Dunsworth et al. |
| 6,408,766 B1 | 6/2002 | McLaughlin et al. |
| 6,417,646 B1 | 7/2002 | Huykman et al. |
| 6,421,618 B1 | 7/2002 | Kliman et al. |
| 6,441,581 B1 * | 8/2002 | King et al. ................. 320/101 |
| 6,449,536 B1 | 9/2002 | Brousseau et al. |
| 6,456,674 B1 | 9/2002 | Horst et al. |
| 6,456,908 B1 | 9/2002 | Kumar |
| D464,622 S | 10/2002 | Donnelly |
| 6,470,245 B1 | 10/2002 | Proulx |
| 6,486,568 B1 | 11/2002 | King et al. |
| 6,497,182 B2 | 12/2002 | Melpolder et al. |
| 6,507,506 B1 | 1/2003 | Piñas et al. |
| 6,532,405 B1 | 3/2003 | Kumar et al. |
| 6,537,694 B1 | 3/2003 | Sugiura et al. |
| 6,564,172 B1 | 5/2003 | Till |
| 6,581,464 B1 | 6/2003 | Anderson et al. |

| | | | |
|---|---|---|---|
| 6,591,758 B2 | 7/2003 | Kumar | |
| 6,608,396 B2 | 8/2003 | Downer et al. | |
| 6,611,116 B2 | 8/2003 | Bachman et al. | |
| 6,612,245 B2 | 9/2003 | Kumar et al. | |
| 6,612,246 B2 | 9/2003 | Kumar | |
| 6,615,118 B2 | 9/2003 | Kumar | |
| 6,618,662 B2 | 9/2003 | Schmitt et al. | |
| 6,627,345 B1 | 9/2003 | Zemlok et al. | |
| 6,634,303 B1 | 10/2003 | Madsen et al. | |
| 6,653,002 B1 | 11/2003 | Parise | |
| 6,658,331 B2 | 12/2003 | Horst et al. | |
| 6,678,972 B2 | 1/2004 | Naruse et al. | |
| 6,688,481 B1 | 2/2004 | Adner et al. | |
| 6,691,005 B2 | 2/2004 | Proulx | |
| 6,697,716 B2 | 2/2004 | Horst | |
| 6,725,134 B2 | 4/2004 | Dillen et al. | |
| 6,728,606 B2 | 4/2004 | Kumar | |
| 6,737,822 B2 | 5/2004 | King | |
| 6,765,315 B2 | 7/2004 | Hammerstrom et al. | |
| 6,812,656 B2 | 11/2004 | Donnelly et al. | |
| 6,823,835 B2 | 11/2004 | Dunsworth et al. | |
| 6,829,529 B2 | 12/2004 | Trefzer et al. | |
| 6,829,556 B2 | 12/2004 | Kumar | |
| 6,879,054 B2 | 4/2005 | Gosselin | |
| 6,885,920 B2 | 4/2005 | Yakes et al. | |
| 6,909,200 B2 | 6/2005 | Bouchon | |
| 6,909,201 B2 | 6/2005 | Murty et al. | |
| 6,909,959 B2 | 6/2005 | Hallowell | |
| 6,941,218 B2 | 9/2005 | Wolf et al. | |
| 6,973,880 B2 | 12/2005 | Kumar | |
| 7,057,376 B2* | 6/2006 | Cook et al. | 323/207 |
| 7,064,507 B2 | 6/2006 | Donnelly et al. | |
| 7,102,313 B2 | 9/2006 | Kadota et al. | |
| 2002/0190525 A1 | 12/2002 | Worden et al. | |
| 2003/0006745 A1 | 1/2003 | Hammerstrom et al. | |
| 2003/0104899 A1* | 6/2003 | Keller | 477/2 |
| 2003/0150352 A1 | 8/2003 | Kumar | |
| 2003/0151387 A1 | 8/2003 | Kumar | |
| 2003/0233959 A1 | 12/2003 | Kumar | |
| 2004/0133315 A1 | 7/2004 | Kumar et al. | |
| 2004/0216636 A1* | 11/2004 | Emori et al. | 105/26.05 |
| 2004/0238243 A1* | 12/2004 | King et al. | 180/65.2 |
| 2005/0006956 A1* | 1/2005 | Shi | 307/43 |
| 2005/0024001 A1 | 2/2005 | Donnelly et al. | |
| 2005/0045058 A1 | 3/2005 | Donnelly et al. | |
| 2005/0151513 A1* | 7/2005 | Cook et al. | 320/137 |
| 2005/0151517 A1* | 7/2005 | Cook et al. | 323/207 |
| 2005/0206230 A1 | 9/2005 | Donnelly | |
| 2005/0206331 A1 | 9/2005 | Donnelly | |
| 2005/0279243 A1 | 12/2005 | Bendig et al. | |
| 2006/0001399 A1 | 1/2006 | Salasoo et al. | |
| 2006/0061213 A1* | 3/2006 | Michalko | 307/9.1 |
| 2006/0076171 A1 | 4/2006 | Donnelly et al. | |
| 2006/0119177 A1* | 6/2006 | Kumar et al. | 307/9.1 |

FOREIGN PATENT DOCUMENTS

| | | |
|---|---|---|
| CA | 2411132 | 11/2002 |
| GB | 873167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 2004/042890 | 5/2004 |
| WO | WO 2005/030550 | 4/2005 |
| WO | WO 2005/079504 | 9/2005 |
| WO | WO 2005/084335 | 9/2005 |
| WO | WO 2005/086910 | 9/2005 |
| WO | WO 2005/097573 | 10/2005 |
| WO | WO2005/114811 | 12/2005 |
| WO | WO 2006/020587 | 2/2006 |

OTHER PUBLICATIONS

U.S. Appl. No. 11/143,252, Donnelly.
International Search Report for counterpart International Patent Application No. PCT/US05/28314 dated Jun. 22, 2006. (5107-13-PCT).
International Written Opinion for counterpart International Patent Application No. PCT/US05/28314 dated Jun. 22, 2006. (5107-13-PCT).
Perreault, David J. et al, "A New Design For Automotive Alternators", Massachusetts Institute of Technology, 12 pages, no date.
Railway Age, "Switchers, the Gen-Set generation", Simmons-Boardman Publishing Corporation, vol. 207 No. 3, copyright 2006, 1 page.
U.S. Appl. No. 11/060,087, filed Feb. 17, 2004, Donnelly.
U.S. Appl. No. 11/060,221, filed Feb. 17, 2004, Donnelly.
U.S. Appl. No. 11/060,223, filed Feb. 17, 2004, Donnelly et al.
U.S. Appl. No. 11/070,848, filed Mar. 1, 2005, Maier.
U.S. Appl. No. 11/075,550, filed Mar. 8, 2005, Donnelly.
U.S. Appl. No. 11/095,036, filed Mar. 30, 2005, Donnelly.
U.S. Appl. No. 60/600,330, filed Aug. 9, 2004, Donnelly.
U.S. Appl. No. 60/607,194, filed Sep. 3, 2004, Donnelly.
U.S. Appl. No. 60/616,173, filed Oct. 4, 2004, Donnelly.
U.S. Appl. No. 60/618,631, filed Oct. 13, 2004, Donnelly.
U.S. Appl. No. 60/618,632, filed Oct. 13, 2004, Donnelly.
U.S. Appl. No. 60/674,837, filed Apr. 25, 2005, Donnelly.
Thompson, "Electric Transportation," International Textbook Co., Scranton, Pa; (1st Ed., 1940), pp. 254-262.
Mendler, "The Technological Opportunities of Hybrid Electric Vehicles," Society of Automotive Engineers, Inc. (1996), pp. 1-16.
Mercer, "Innovative Use of Horsepower—Hybrid Bus Powered by Gas Turbine," *Diesel Progress* (Dec. 1997), pp. 56-57.
Berg, "Concept Truck Addresses Future Clean Air Demands With Hybrid Turbine-Electric Powertrain," *Emissions Alternatives Fuels* (date unknown), pp. 55-57.
FMTV—with HybriDrive Propulsion System, pp. 1-3, no date.
Nene, "Advanced Propulsion Systems for Urban Rail Vehicles: Chapter 2: DC Drives with a Chopper Controller," Prentice-Hall, Inc. (1985), pp. 18-45.
Kostic et al., "An Analytic Solution of the Choppers Ripple Currents," Proceedings of the 1993 IEEE/ASME Joint Railroad Conference, Apr. 1993, pp. 103-107.
Hassan Moghbelli et al., "Chopper Design for NICTD Locomotives," Proceedings of the 1993 IEEE/ASME Joint Railroad Conference, Apr. 1993, pp. 67-75.
C.E. Band et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), 1-page.
M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.
Joseph Szymborski et al., "Examination of VRLA Battery Cells Sampled from the Metlakatla Battery Energy Storage System", 15 pages, no date.
"Locomotive Energy Storage System," Advanced Railway Technology, Inc. (Dec. 1985), 22 pages.
Declaration of Frank Donnelly Under 37 CFR § 1.98, 5 pages, no date.
Declaration of Ronald Bailey under 37 CFR § 1.98 dated Dec. 3, 2004 for U.S. Appl. No. 10/650,011, 3 pages.
"Lead-Acid Battery State of Charge vs. Voltage", Richard Perez, Home Power #36, Aug./Sep. 1993, 5 pages.
"Thermal Evaluation of the Honda Insight Battery Pack" M.D. Zolot et. al. National Renewable Energy Laboratory, Presented at the 36th Intersociety Energy Conversion Engineering Conference, Savannah Georgia, Jul. 29 to Aug. 2, 2001, 9 pages.

"Development of a New Battery System for Hybrid Vehicle", Tomokazu Yamauchi et al, Toyota, presented at the EVS 17 in Montreal, Oct. 2000, 7 pages.

"Supercapacitive Energy Storage for Diesel-Electric Locomotives", Destraz, Barrade and Rufer, Swiss Federal Institute of Technology, paper presented at SPEEDAM Jun. 16, 2004, Capri, Italy, 6 pages.

Press Release: "French Railway Company Voies Ferees Legeres et Industielles (VFLI) Puts Its Trust in Deutch Engines", Jun. 2003, 2 pages.

"LNG as a Fuel for Railroads: Assessment of Technology Status and Economics", Pera and Moyer, Acurex Corporation, 1993, Gas Research Institute contract No. 5091-292-2153, 122 pages.

"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995, 30 pages.

"Linear/Switchmode Voltage Regulator Handbook" Motorola, Inc. 1982, 3 pages.

"The Control of Switched Reluctance Drives and their Use for Flywheel Energy Storage", Brabandere et al. 5 pages, no date.

"Performance and Control of the Switched Reluctance Motor", Dahdah et al, University of Western Sydney, Australia, 4 pages, no date.

Design of Switched Reluctance Motors and Development of a Universal Controller for Switched Reluctance and Permanent Magnet Brushless DC Motors, Phd Dissertation, Virginia Polytechnic Institute and State University, Prahveen Vijayraghavan, Blacksburg, VA, Nov. 2001, 215 pages.

"Li-Ion Battery-Powered Buck-Boost Regulator Minimizes Portable Product Size", Chen, IIC-China/ESC-China Conference Proceedings, 2002, 5 pages.

"The Car and Locomotive Encyclopedia" by Kalmbach Publishing Company, 1980, 3 pages.

"Motor Control Electronics Handbook" edited by Richard Valentine, McGraw Hill 1998, ISBN 0-07-066810-8, 1998, 31 pages.

"Progress in Overcoming the Failure Modes Peculiar to VRLA Batteries", A. Cooper, P.T. Moseley, Journal of Power Sources 113 (2003) 200-208.

"Research Results from the Advanced Lead-Acid Battery Consortium Point the Way to Longer Life and Higher Specific Energy for Lead/Acid Electric-vehicle Batteries", P.T. Moseley, Journal of Power Sources 73 (1998) 122-126.

"Improving the Valve-Regulated Lead Acid Battery", P.T. Moseley, Journal of Power Sources 88 (2000) 71-77.

"Keeping Up the Pressure-Strategies to Maintain Plate-Group Pressure and Extend the Cycle Life of VRLA Batteries", M.J. Weighall, Journal of Power Sources 95 (2001) 209-217.

"VRLA Traction", First International Symposium on the Use of VRLA Batteries in Traction Application, Honolulu, Jun. 2005.

T. Nakagawa et al., Improvement of diesel electric locomotive traction system, 7th World Congress on Railway Research, Jun. 4-8, 2006, Montreal.

* cited by examiner

LOCOMOTIVE POWER TRAIN ARCHITECTURE

CROSS REFERENCE TO RELATED APPLICATION

The present application claims the benefits, under 35 U.S.C. §119(e), of U.S. Provisional Application Ser. Nos.: (a) 60/600,330, filed Aug. 9, 2004, entitled "Regenerative Braking Methods for a Hybrid Locomotive"; (b) 60/607, 194, filed Sep. 3, 2004, entitled "Locomotive Power Train Architecture"; (c) 60/616,173, filed Oct. 4, 2004, entitled "Regenerative Braking Methods for a Hybrid Locomotive"; (d) 60/618,632, filed Oct. 13, 2004, entitled "Locomotive Power Train Architecture"; (e) 60/618,631, filed Oct. 13, 2004, entitled "Regenerative Braking Methods for a Hybrid Locomotive"; and (f) 60/692,358, filed Jun. 20, 2005, entitled "Multiple Engine Locomotive Configuration"; all to Donnelly, et al. and each of which is incorporated herein by this reference.

FIELD

The present invention relates generally to a power control architecture for a vehicle and particularly to a locomotive power control architecture utilizing a plurality of engine, fuel and drive train combinations.

BACKGROUND

Railroad locomotives are typically powered by diesel-electric systems or by diesel-hydraulic systems. Conventional stand-alone locomotives have output power typically ranging from approximately 300 horsepower (for example, locomotives used in mining and tunneling) to approximately 6,000 horsepower (for example, locomotives for long haul cross-country freight trains).

Railroads are under increasing pressure to reduce emissions and fuel consumption while maintaining high power capability necessary for rapid acceleration and/or high tractive effort as two common examples. One of several responses to these forces has been the development of hybrid locomotives. Donnelly has disclosed the use of a battery-dominant hybrid locomotive in U.S. Pat. No. 6,308, 639 which is incorporated herein by reference. Hybrid locomotives can reduce emissions and fuel consumption in many rail situations such as yard switching but they become less effective for medium haul freight or commuter trains.

Donnelly has also disclosed a method and apparatus for controlling power provided to DC traction motors by furnishing an individual chopper circuit for each traction motor in U.S. Pat. No. 6,812,656 which is incorporated herein by reference. Donnelly et al. have disclosed a method of monitoring, synchronizing and optimizing the operation of the locomotive drive train in U.S. patent application Ser. No. 10/649,286.

The present inventor has further disclosed a system for controlling a dynamic and regenerative braking system for a hybrid locomotive which employs a control strategy for orchestrating the flow of power amongst the prime mover, the energy storage system and the regenerative braking system in a U.S. Provisional Patent Application 60/600,330 which is also incorporated herein by reference.

Other strategies to reduce emissions and fuel consumption involve combinations of conventional and hybrid locomotives in a consist. Donnelly et al. have disclosed a method of allocating energy amongst members of a consist in U.S. patent application Ser. No. 11/070,848; and have disclosed a method for monitoring, controlling and/or optimizing the emission profile for a hybrid locomotive or consist of hybrid locomotives in U.S. patent application Ser. No. 11/095,036, all of which are also incorporated herein by reference.

In the search for efficient engine and fuel strategies, many different power plant and power delivery strategies, other than hybrid systems, have been investigated. Some of these strategies have been based on alternative, cleaner burning fuels. An example of an alternate fuel strategy is contained in a report entitled "LNG as a Fuel for Railroads: Assessment of Technology Status and Economics" which is incorporated herein by reference. This reference discusses the use of diesel fuel or LNG in a diesel engine. Another reference entitled "Comparative Economic Assessment of a Natural Gas Fueled Locomotive with On-Board CNG Storage to Diesel and LNG Variants" discusses the use of natural gas as a fuel for diesel or gas turbine engines and is incorporated herein by reference. An alternate fuel strategy usually involves a substantial change in railroad infrastructure, especially in countries where the infrastructure is based on primarily on diesel fuel.

Yet other strategies to reduce emissions and fuel consumption or increase locomotive power have involved dual engine or multiple engine configurations. Often a multi-engine locomotive can be comprised of engines each of which can provide power to separate driving wheel assemblies or separate groups of driving wheel assemblies. In other designs, the AC electrical output of two engine/alternator systems have been synchronized to provide power to an AC bus which, in turn, provides power to all the locomotive's traction motors. Older multi-engine designs have utilized synchronized mechanical transmissions to supply power directly to the driving wheel assemblies.

The present inventor has previously disclosed a booster unit for diesel electric locomotive comprised of a diesel engine and a gas turbine connected via a DC bus to a series of traction motors in Canadian Patent 1,283,472 which is incorporated herein by reference. This invention does not require its engines to be synchronized but has no load control for its traction motors.

Recently, a French Railway Company, VFLI, disclosed a dual-engine locomotive utilizing a common DC bus electrical transmission where the two engines need not be synchronized. The second engine in this design is brought on-line using a simple algorithm. Under this algorithm, when the power output of the first engine exceeds 70% of its rated value, the second engine is brought on-line.

For application to locomotives with two or more engines to reduce emissions and fuel consumption, Donnelly et all have disclosed a versatile multiple engine control strategy in U.S. Provisional Application 60/674,837 and a high-power density engine packaging method in U.S. Provisional Application entitled "Multiple Engine Locomotive Configuration" filed Jun. 20, 2005. These provisional applications are also incorporated herein by reference.

There remains a need for a straightforward locomotive power plant and drive train architecture that can be applied to a variety of traction motor and drive train configurations known to the rail industry to reduce emissions and fuel consumption and/or increase locomotive power by allowing for (1) the use of various prime movers, (2) the use of various fuels, (3) addition of an energy storage system for propulsion power assist or full propulsion and (4) a regenerative braking system.

SUMMARY

These and other needs are addressed by the various embodiments and configurations of the present invention which are directed generally to controlling various prime power, energy storage and/or regenerative braking systems for powering a variety of off road vehicular (e.g., locomotive) transmission and traction motor combinations as well as providing auxiliary power for the vehicle (e.g., for the locomotive and trailing cars).

The inventions disclosed herein are applicable to both hybrid and non-hybrid locomotives as well as to other types of off hybrid and non-hybrid road vehicles that require substantial power and low emissions utilizing various power plant combinations.

In one embodiment of the present invention, the present invention discloses a method for using voltage control and current monitoring to co-ordinate and/or optimize the use of two or more power sources to provide power to a DC bus and thereupon to a variety of motor and drive train configurations commonly used on locomotives and various other types of off road vehicles. The power to the individual motors is independently controlled.

In one configuration, two or more diesel engines are utilized to power DC or AC traction motors which may have a common or individual power control apparatuses. The traction motors utilize a fixed-ratio mechanical gear train to couple the output mechanical energy of the traction motors to the driving axles.

In another configuration, two or more engines of differing types are utilized to power DC or AC traction motors which may have common or individual power control apparatuses.

In another configuration, two or more engines of differing types and one or more energy storage units are utilized to power DC or AC traction motors which may have common or individual power control apparatuses.

In another configuration, various power supply units are utilized along with an inverter to power a motor such as for example, an induction motor, a permanent magnet motor, a switched reluctance motor or an AC traction motor. The motor in turn is coupled mechanically to a variable gear ratio hydraulic transmission (also known as a hydrodynamic or turbo transmission) which, in turn, drives all the propelling axles on the locomotive typically utilizing a system of gears, drive shafts and couplings.

In yet another configuration, a hybrid locomotive consisting of two engines, an energy storage system and a regenerative braking system is disclosed utilizing the DC bus architecture of the present invention.

In yet another configuration, a diesel locomotive consisting of six engines and a dynamic braking system is disclosed utilizing the DC bus architecture of the present invention.

An additional aspect of the above configurations is the use of induction alternators or various other known energy conversion devices operated as motors to start or restart diesel engines using power supplied from a DC bus.

The above-described embodiments and configurations are neither complete nor exhaustive. As will be appreciated, other embodiments and configurations of the invention are possible utilizing, alone or in combination, one or more of the features set forth above or described in detail below.

A common or unifying concept of a preferred embodiment of the present invention is the use of a DC electrical bus whose bus voltage level controls the amount of power flow from the various prime mover and/or energy storage power supplies. The output voltage level of the bus is controlled by the power source or power sources that generate the highest DC voltage. Each power supply has its own means of regulating its output voltage so that each can be controlled by other means to provide an output voltage that allows it to be engaged or disengaged at will from the power flow to the DC bus. This architecture therefore does not require synchronization of power supplies to provide power to the DC bus which, in turn, may supply regulated or unregulated power to the propulsion motors. This architecture also permits the use of various numbers and types of power supplies to be used in conjunction with various types of motors and drive train configurations without special modification to the power supplies, the drive motors or the control circuitry.

In a preferred embodiment, the power supplied by the DC bus to the wheel driving motors is controlled independently of the DC bus voltage. The power flow from the DC bus to the motors driving the wheels is regulated by independent control of the voltage supplied to the motors using for example inverters or choppers.

In a less preferred embodiment, the voltage level of a DC electrical bus is controlled by the power consumption of the load on the DC bus. This load may be comprised of unregulated traction motors, auxiliary power supplies and a dynamic braking system.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

A diesel-electric locomotive is commonly a diesel powered railroad prime mover which includes an engine, generator, and traction motors on each propulsion axle.

A diesel-hydraulic locomotive is commonly a diesel powered railroad prime mover which includes an engine, a transmission and a drive system connecting one or more propelling axles. Less commonly, a diesel-hydraulic locomotive includes an engine, an electric motor and pumps which operate hydraulic motors on one or more propelling axles.

A cabless locomotive is a locomotive not having a functional operator's enclosure or cab. In a functional operator's cab, the locomotive may be operated with protection from outside weather, noise and fumes. In a functional operator's cab, the operator has available at least throttle controls, braking controls and locomotive status displays. A cabless locomotive may not have an operator's cab or it may have the cab windows blacked out and the door locked to render the cab unuseable.

A motor refers to a device that produces or imparts motion.

A traction motor is a motor used primarily for propulsion such as commonly used in a locomotive. Examples are an AC or DC induction motor, a permanent magnet motor and a switched reluctance motor.

An engine refers to any device that uses energy to develop mechanical power, such as motion in some other machine. Examples are diesel engines, gas turbine engines, microturbines, Stirling engines and spark ignition engines A prime power source refers to any device that uses energy to develop mechanical or electrical power, such as motion in some other machine. Examples are diesel engines, gas turbine engines, microturbines, Stirling engines, spark ignition engines or fuel cells.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use.

An electrical energy converter refers to an apparatus that converts mechanical energy to electrical energy. Examples include an alternator, an alternator-rectifier and a generator.

A power control apparatus refers to an electrical apparatus that regulates, modulates or modifies AC or DC electrical power. Examples are an inverter, a chopper circuit, a boost circuit, a buck circuit or a buck/boost circuit.

Power density as used herein is power per unit volume (watts per cubic meter).

Specific power as used herein is power per unit mass (watts per kilogram).

A hybrid vehicle combines an energy storage system, a prime power unit, and a vehicle propulsion system. A parallel hybrid vehicle is configured so that propulsive power can be provided by the prime power source only, the energy storage source only, or both. In a series hybrid vehicle, propulsive power is provided by the energy storage unit only and the prime power source is used to supply energy to the energy storage unit.

When the energy storage capacity is small and the prime power source is large, the hybrid may be referred to as a power-assist hybrid. For example, an electric drive may be used primarily for starting and power assist while an internal combustion engine used primarily for propulsion. These vehicles are typically parallel hybrids.

In a dual-mode hybrid, the energy storage and prime power are approximately balanced. For example, a dual-mode hybrid can operate on electric drive only, on engine power only, or on a combination of both. These vehicles are typically parallel hybrids.

A range-extended hybrid has a large energy storage capacity and a small prime power source. An example would be an electric drive vehicle with a small engine used for charging an electrical energy storage unit. These vehicles are typically series hybrids.

A battery-dominant hybrid locomotive is a dual-mode hybrid locomotive where the energy storage apparatus is a battery pack and the battery pack is capable of supplying approximately as much or more instantaneous power than the prime power source when both are engaged with the propulsion system.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
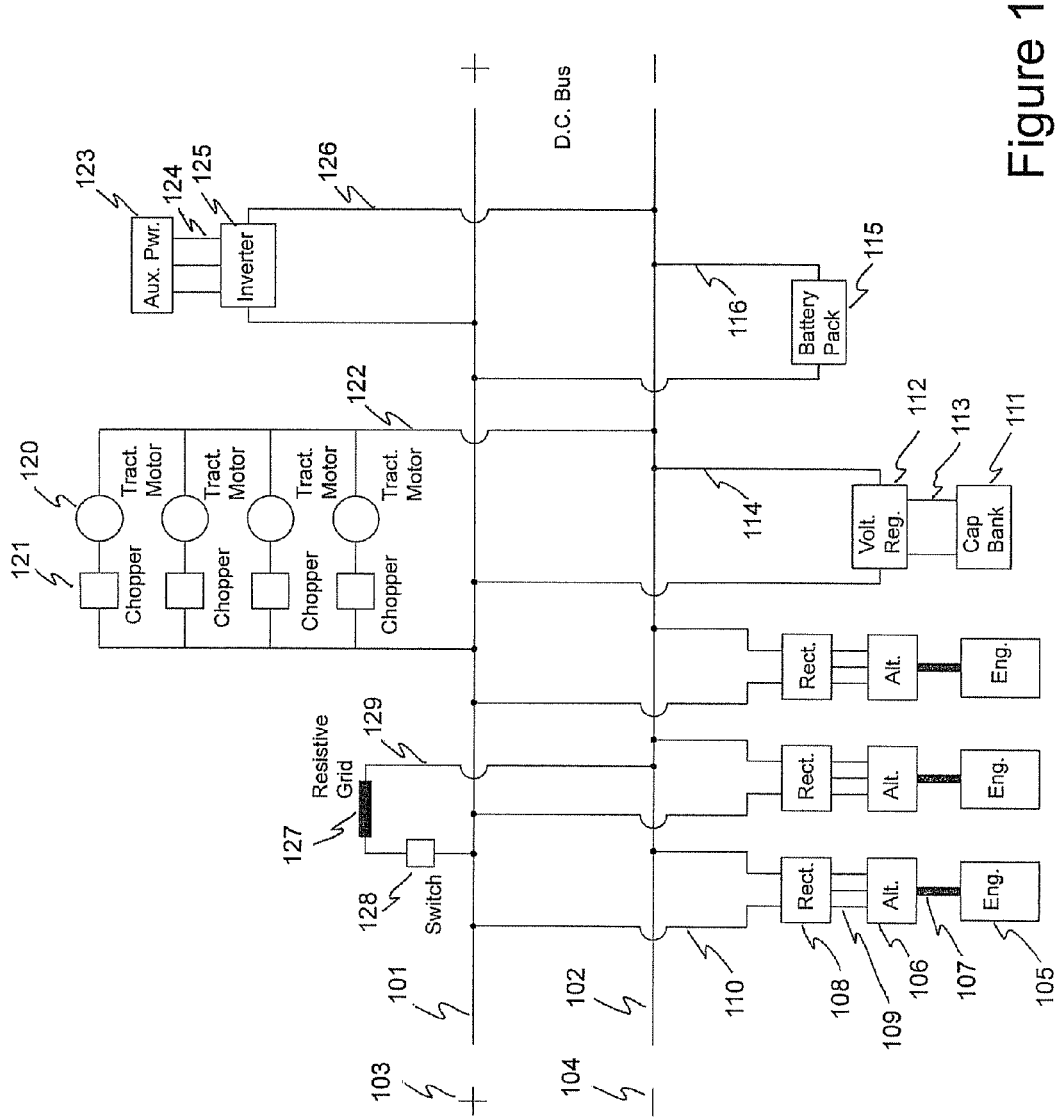
FIG. 1 is a schematic overview diagram of a general locomotive power and drive train architecture.

FIG. 1 is a schematic diagram of the general locomotive and drive train architecture of the present invention. In this architecture, power sources (prime movers, energy storage systems and traction motors acting as generators), propulsion motors, auxiliary power supplies and other power consumers are shown connected in parallel to a DC bus. This example is presented to show the variety of electrical power generators, consumers and storage systems that can be connected to the DC bus architecture. Electrical connections are shown as light lines while mechanical connections are represented by heavy lines. The DC bus is shown as a bus bar 101 which is taken to be positive 103 and a bus bar 102 which is taken to be negative 104. Three engines 105 are shown connected mechanically by drive shafts 107 to alternators 106. The three phase AC output of the alternators 106 are connected electrically 109 to rectifier circuits 108 which in turn supply DC power to the DC bus via connection 110. An electrical power storage device 111, which can be a capacitor bank for example, is electrically connected 113 to a power control device 112 which in turn is connected electrically 114 to the DC bus. The power control device 112 may be for example a buck/boost circuit that regulates the voltage to the storage device 111 for charging or discharging. Alternately, apparatus 111 can be a fuel cell electrically connected 113 to a voltage regulator 112 which in turn is connected electrically 114 to the DC bus. Another electrical storage device 115, which can be a battery pack, is electrically connected 116 directly to the DC bus. This may be preferred, for example, for a battery dominant hybrid where the DC bus voltage can be controlled by the voltage across the battery pack 115. Four traction motors 120 are shown with their power control apparatuses 121 connected electrically 122 to the DC bus. The power control apparatuses 121 may be chopper circuits if DC traction motors are used or inverters if AC traction motors are used. An AC auxiliary power supply 123 is shown electrically connected 124 to an inverter 125 which in turn is connected electrically 126 to the DC bus. Finally a resistive grid 127 for dynamic braking is shown connected in series with a switch 128 and electrically connected 129 to the DC bus. The system shown in FIG. 1 can be operated in motoring mode where power flows from one or more of the power sources 105, 111 and 115 to the traction motors 120 and the auxiliary power supply 123. The system can be operated in braking mode where power flows from the traction motors 120, now operating as generators, to provide power to the auxiliary power supply 123 and the energy storage units 115 and 111 when the latter is, for example, a capacitor bank. If the energy storage systems are fully charged, then braking energy can be diverted to the resistive grid 127 to be dissipated. As described in a separate patent application entitled "Method for Dissipating Braking Energy on a Locomotive", excess braking energy can be dissipated by reverse power flow to the engines when the rectifier circuit 108 is an inverter circuit. The power sources 105 may be prime movers such as, for example, diesel engines, gas turbines, microturbines, switched reluctance generators, induction generators, Stirling engines, fuel cells, spark ignition engines or combinations of these. The prime movers may utilize a variety of fuels such as diesel fuel, natural gas, gasoline or hydrogen. The power sources 111 and 115 may also be energy storage devices such as for example a battery pack, a bank of capacitors, a compressed air storage system, a bank of flywheels or combinations of these. The energy conversion devices 106 may be for example induction alternators, switch reluctance motor/generators, permanent magnet alternator/rectifiers, or DC generators any of which may receive power from an engines by a mechanical shaft connections 107. Alternately, the energy conversion device 112 may be for example an electrical power conditioning apparatus which may receive power from a fuel cell by an electrical connection 113. If the energy conversion device 106 is an induction alternator, switch reluctance motor/generator or permanent magnet alternator/rectifier, then it will require a rectifying circuit 108 to convert AC power to DC power for transmission to the DC bus. The DC bus is commonly a heavy positive conductor 101 and negative conductor 102 pair which is typically a pair of copper bus bars. The motors 120 may be traction motors for propulsion while power supply 123 may be one or more motors for operating air compressors and traction motor cooling blowers, AC or DC motors for providing auxiliary power and the like.

Each motor or power supply may have its own separate power control apparatus Groups of motors and power supplies may also share a common power control apparatus. The power control apparatuses may be for example inverters, chopper circuits, buck, boost or buck/boost circuits, rectifiers or AC to DC converters. As will be discussed in FIG. 2, this power supply strategy can be extended to include energy storage systems. As discussed in U.S. Provisional Patent Application 60/600,330 which was previously incorporated herein by reference, this architecture can also incorporate a regenerative braking system for recovering energy to an energy storage system. In a dynamic braking system, electrical energy may flow from the motors to the DC bus and from the DC bus may be transmitted to one of the energy storage devices or to grid of dissipating power resistors.

There are several ways in which the DC bus voltage may be managed. These include:
1. maintaining a constant DC bus voltage.
2. maintaining a constant DC bus voltage over a first predetermined range of operation and a different constant DC bus voltage over a second predetermined range of operation and so forth.
3. allowing the DC bus voltage to vary in accordance with load power demand
4. allowing DC bus voltage to vary in accordance with the output voltage of a large energy storage system.

Figure 2:
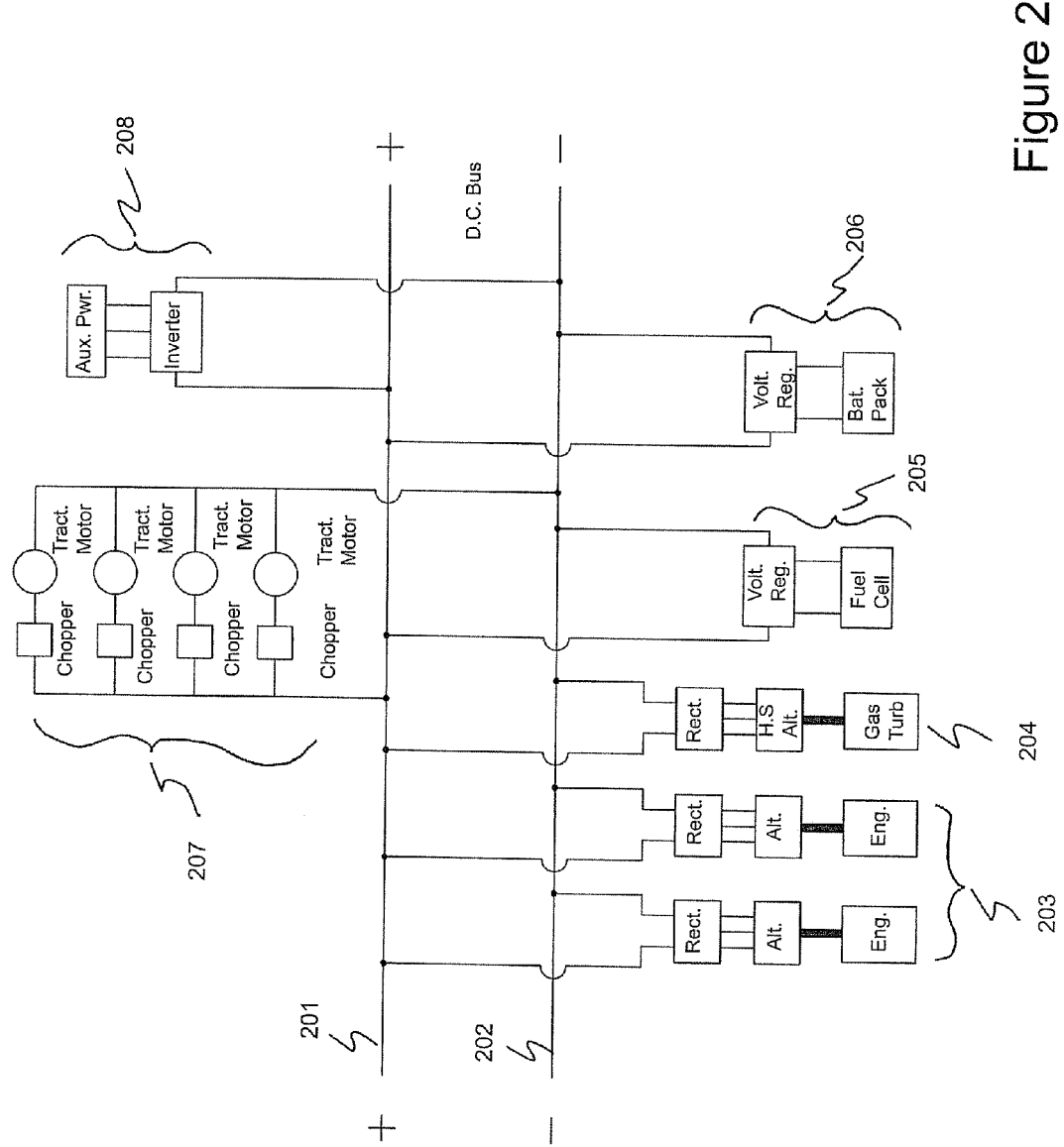
FIG. 2 is a schematic diagram showing several types of power supplies driving four independently controlled DC traction motors.

FIG. 2 is a schematic diagram showing an example of 4 types of power supplies 203, 204, 207, 205 and 206 connected in parallel to a DC bus represented by bus bars 201 and 202 to provide DC power to 4 independently controlled DC traction motors shown collectively by 207. The conventions, such as mechanical and electrical connections, used in FIG. 1 are also used in FIG. 2. A first power supply type 203 may be diesel engines whose shaft power is converted to DC electrical output by an alternator/rectifiers which in turn are connected to the DC bus. The power outputs of the diesel engine systems 203 are controlled independently by their individual excitation means contained in their respective alternators. A second power supply type 204 may be a gas turbine engine whose shaft power is converted to DC electrical output by a high speed alternator/rectifier which is also connected to the DC bus. The power output of the gas turbine engine system 204 is controlled by an excitation means contained in its alternator. A third power supply type 205 may be a fuel cell whose electrical output is converted to the appropriate DC level by a buck/boost or voltage regulator circuit which in turn is connected to the DC bus. The power output of the fuel cell 205 is controlled by its buck/boost or voltage regulator circuit. A fourth power supply type 206 may be an energy storage system which may be a battery pack or capacitor bank whose electrical output is converted to the appropriate DC level by a buck/boost circuit which in turn is connected to the DC bus. In this example, the power output of the energy storage system 206 is controlled by a buck/boost circuit. The alternator/rectifier apparatuses in engine systems 203 may contain blocking diodes to prevent reverse power flow from the DC bus when the DC output voltage of a particular engine is less than the voltage across the DC bus. The power conditioning apparatus for the energy storage system 206 may be controlled to allow power flow from the DC bus for recharging the system by any of the prime movers 203 and 205, or by a regenerative braking system if available. As can be seen, the voltage across the DC bus is established by the power source with the highest DC output voltage to the bus. Power supplies with lower output DC voltages than that across the bus will not provide power to the bus and will not receive power from the bus unless they are controlled to allow reverse power flow. Thus, by controlling the output voltage of any power supply using its particular excitation or voltage control means, that power supply can be brought on-line to supply power to the DC bus. In this example, the DC bus supplies power to four traction motors connected in a parallel circuit 207. The DC bus may provide power at a predetermined voltage to the traction motor circuit and the power control apparatuses associated with each traction motor control the current flow, and hence the power level, to the traction motors. Thus, in this example, the power delivered to any motor can be controlled independently of the other motors and independently of the power supply or power supplies feeding the DC bus. As can be appreciated, the DC bus can supply power to four parallel inverter circuits each controlling a corresponding AC traction motor or to four parallel chopper circuits each controlling a corresponding DC traction motor.

The following is an example of how such a locomotive architecture can operate. The diesel engines 203 can be powered up to provide power to the bus at a predetermined first voltage. Concurrently, the gas turbine 204 may be turned off. The buck/boost circuit controlling the fuel cell 205 may be set to a second predetermined voltage that is less then the first predetermined voltage so that the fuel cell 205 initially does not provide power to the bus. The buck/boost circuit of the energy storage system 206 is set to a third predetermined output voltage that is less than the first predetermined voltage so that the energy storage system 206 also does not provide power to the bus. The traction motors 207 each receive approximately the same amount of power at a desired level as determined by the engineer. The amount of power sent to each motor 207 may be independently varied by their corresponding power control apparatuses to eliminate, for example, occurrences of non-synchronous wheel slip. If for example, it is desired to reduce emissions in a particular portion of the route, the excitation to alternator/rectifiers of engines 203 can be reduced, to idle or turn off engines 203 and discontinue their power input to bus 211. Concurrently, the gas turbine 204 can be started and the excitation to its high speed alternator/rectifier can be increased to the first predetermined voltage to bring the power from the gas turbine on-line. In addition, the buck/boost circuit on the fuel cell system 205 can be commanded to increase its voltage output to the first predetermined voltage to bring the power from the fuel cell 205 on-line. In the event that a further surge in power is required, the buck/boost circuit on the energy storage system 206 can be commanded to increase its voltage output to the first predetermined voltage to bring the power from the energy storage system 206 on-line. As long as the power available from all the power supplies that are on-line is sufficient to provide the power desired for the traction motors 207, the motors 207 can be controlled independently as desired. If more power is demanded than is available, the voltage across bus will begin to fall and may fall low enough to allow the remaining power supplies to automatically come on-line. Alternately, the DC output voltage of the off-line power supplies can be increased to just below or to the first predetermined voltage so that they come on-line to provide any additional power requirements.

As can be appreciated, auxiliary locomotive and other train power supplies can be driven from the common bus with the appropriate voltage matching apparatus.

As can also be appreciated, the diesel engines can be operated on diesel fuel or natural gas (compressed gas or liquid) and the gas turbine can also be operated on diesel fuel or natural gas. In both cases the operating characteristics of the engines may be somewhat changed. This change to other fuels will require no change to the locomotive architecture and will only require an adjustment, if necessary, in the excitation current applied to the alternator/rectifier apparatuses of those engines so as to be compatible with the desired bus voltage. No synchronization of power supplies is required as for example would be the case with an architecture based on a common AC bus.

As can be further appreciated, this architecture can be utilized to control a number of locomotives and/or energy tender cars to provide power to the individual wheel driving motors. The locomotives can include combinations of conventional diesel-electric, diesel hydraulic, hybrid and cabless locomotives. The architecture can be utilized for any energy storage system whose output can be converted to a DC voltage, such as battery packs, capacitor banks and flywheel generators.

As disclosed in U.S. Provisional Patent Application 60/600,330 which was previously incorporated herein by reference, this architecture can be utilized to recapture energy from a regenerative braking system and distribute it as desired to energy storage devices such as for example a battery pack, a capacitor bank, a flywheel system or the like.

Figure 3:
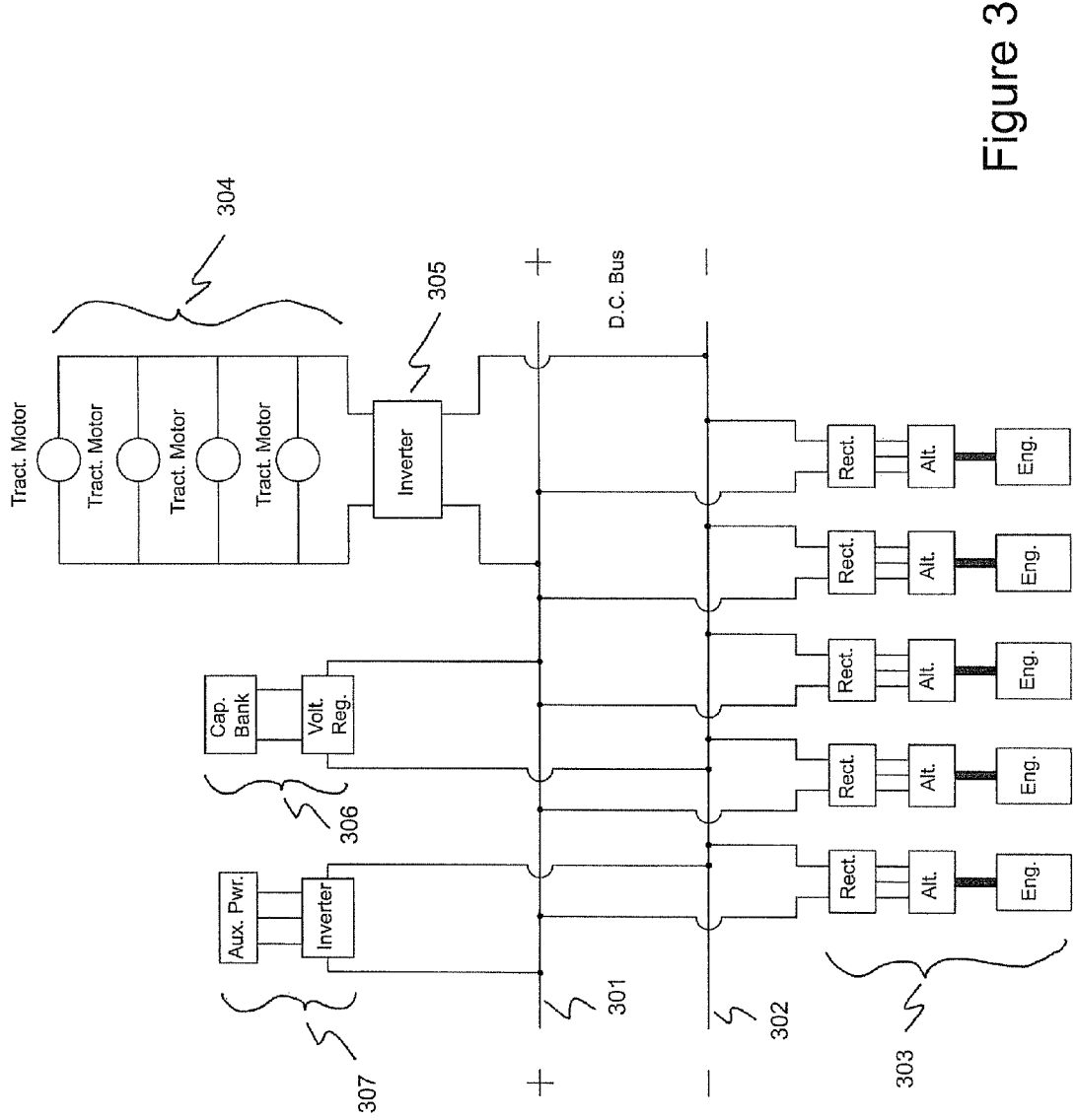
FIG. 3 is a schematic diagram showing several diesel engines driving four independently controlled AC traction motors through a single inverter.

FIG. 3 is a schematic diagram showing an example of 5 diesel engines 303 connected in parallel to a DC bus represented by bus bars 301 and 302 to provide AC power to 4 AC traction motors 304 controlled through a single inverter 305. The same principles can be applied to any number of diesel engines in the range of two engines to about eight engines. Eight engines could in principle correspond to the eight notches of power control typically used in many locomotives. The conventions, such as mechanical and electrical connections, used in FIG. 1 are also used in FIG. 3. This example illustrates how a number of smaller diesel engines which may have highly developed efficiency and emission controls can be used in place of a single large diesel engine. In this example, 4 AC traction motors are used but, as can be appreciated, the number and type of drive motors is independent of the number and type of power supplies. As used herein, a diesel engine system includes the engine and its alternator/rectifier apparatus. The power output of the diesel engine systems 303 are controlled independently by their individual excitation means contained in their alternator/rectifier apparatuses. In this example, the rectifier apparatuses all contain blocking diodes to prevent reverse power flow from the DC bus when the DC output voltage of a particular diesel engine system is less than the voltage across the DC bus. As can be seen, the voltage across the DC bus is established by the diesel engine system or systems with the highest DC output voltage to the bus. Diesel engine systems with lower output DC voltages than the voltage across the bus will not provide power to the bus and will not receive power from the bus because of the blocking diodes contained in their alternator/rectifier apparatuses. Thus, by controlling the output voltage of any diesel engine system using its alternator excitation current, that engine system can be brought on-line to supply power to the DC bus. In this example, the DC bus 321 supplies power to a single inverter apparatus 305 which controls the level of AC power to all four AC traction motors 304. The bus provides a power capacity at a predetermined voltage and the inverter 305 controls the current flow, and hence the power level, to the motors 304. Alternately, the bus can supply power to a single chopper apparatus 305 which controls the level of DC power to four DC traction motors 304.

The above architecture allows a simple operating strategy for energy and emissions management. For example, DC output current from each of the engines' alternator/rectifiers may be measured independently. The desired voltage level on the DC bus may be prescribed as a first predetermined value. If a sufficiently low level of locomotive power is desired, then a first diesel engine is brought on line by raising the excitation current applied to its alternator/rectifier to provide power to the bus at the first predetermined voltage. When the DC current from alternator/rectifier reaches a second predetermined limit and additional locomotive power is required, then a second diesel engine is brought on line by raising the excitation current of its alternator/rectifier to provide the required additional power capability to bus at the first predetermined voltage. As additional locomotive power is required as determined by the locomotive engineer and by the predetermined DC output current limit for each alternator/rectifier, then additional diesel engines can be brought on-line in the same way. Conversely, as less locomotive power is required, then diesel engines can be taken off-line by reducing the excitation current applied to their alternator/rectifiers. In the event of a engine malfunction, this architecture allows the malfunctioning engine to be taken off-line and immediately replaced by another engine, if available. Alternately, if a engine loses partial power, it can still be maintained on-line by raising the excitation current applied to its alternator/rectifier to provide the required additional power output. The above operational options cannot be applied for a locomotive operating with a common AC bus since multiple engines must normally be synchronized in both voltage and frequency.

The above configuration of several diesel engines can have at least three important emissions control advantages. First, the engines can be smaller engines (for example five 750 kW diesels engines) that typically run hotter than a single large engine (for example one 3,750 kW diesel) and therefore the exhaust temperatures are higher which allows a more effective post-treatment of, for example, NOXs by for example any variations of Selective Catalytic Reduction methods. Second, with smaller engines, the residency times of combustion event are shorter which also is known to reduce overall production of NOXs. Third, with the multiple smaller engine scenario, engines not needed can be idled or turned off and less overall fuel is consumed and therefore less overall emissions are generated.

The voltage control strategy articulated above is also compatible with the use of an induction alternator to provide electrical power from the diesel engines to a DC bus. The use of an induction alternator, when at least one electrical power source (for example, a diesel and its alternator, a turbine and its alternator, or an energy storage apparatus) is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above diesel engine start-up procedures are well-known, they can be applied more readily utilizing the voltage control and DC bus architecture of the present invention.

As can be appreciated, auxiliary locomotive and other train power supplies can be driven from the common bus with the appropriate voltage matching apparatus.

Also, the diesel engines can be operated with diesel or natural gas fuels as appropriate with no change in operating strategy or operating options.

Figure 4:
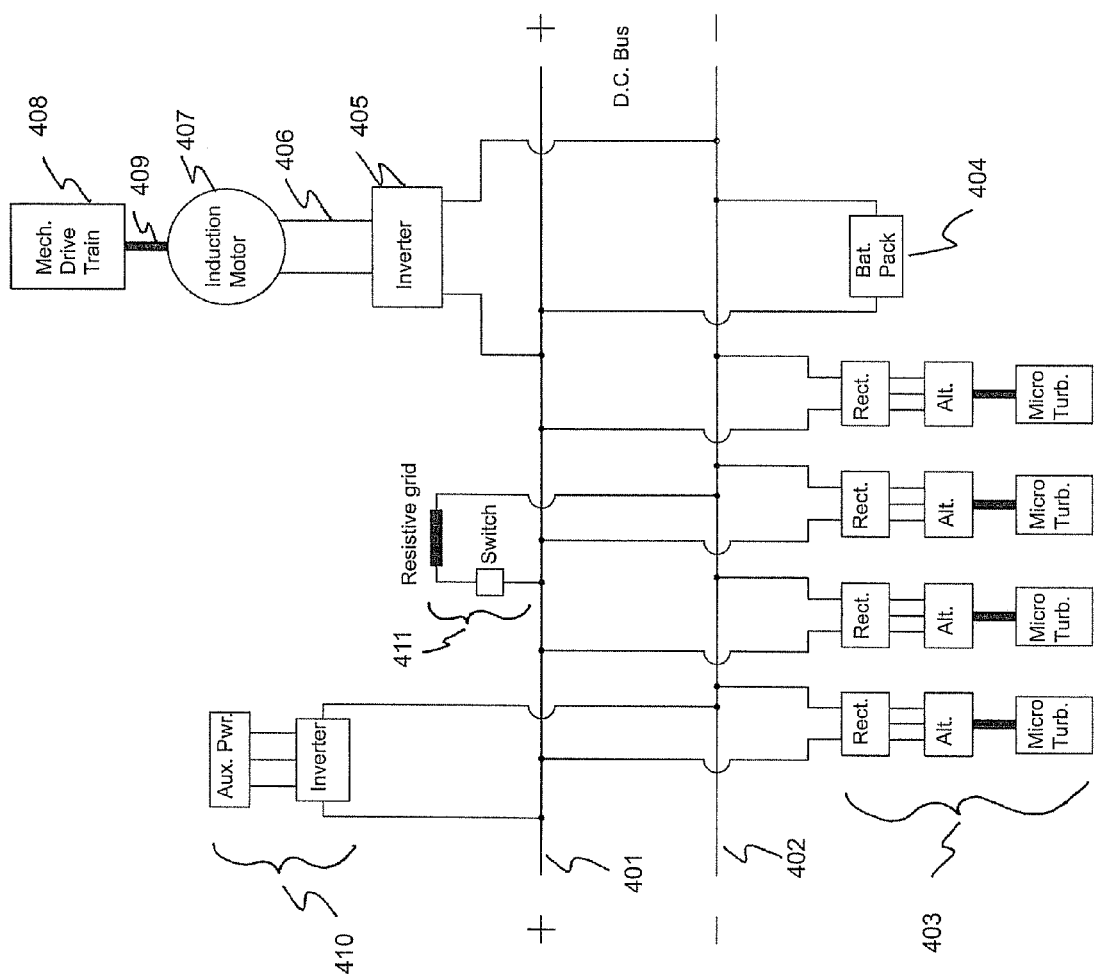
FIG. 4 is a schematic diagram showing several microturbines and an energy storage system driving four axles from a single inverter, motor and gearbox.

FIG. 4 is a schematic diagram showing 4 microturbines 403 and an energy storage system 404 connected in parallel to a DC bus represented by bus bars 401 and 402 to provide AC power through an inverter 405 connected electrically to an induction motor 406 which drives a gearbox, drive shaft and axle system 409 through mechanical couplings represented by 408. This example illustrates how a number of microturbines which can be run on either natural gas or diesel fuel can be used in place of a single large prime mover. The conventions, such as mechanical and electrical connections, used in FIG. 1 are also used in FIG. 4. In this example, the DC power from the bus is converted to AC by inverter 405 and used to power, for example, an induction motor 407. As can be appreciated, the induction motor may be replaced by a permanent magnet motor, a switched reluctance motor, an AC traction motor or the like. The mechanical shaft power output of motor is mechanically connected to a mechanical drive system 409. The mechanical drive system 409 may be comprised of gearbox and any number of known axle drive systems such as for example systems comprised of drive shafts, cardan shafts, universal joints, bevel gears, spur bevel gears, spur gears and the like. Examples of other drive systems include drive shafts and limited slip or self-locking differential systems. As can be appreciated, the number and type of drive system is independent of the number and type of power supplies. An energy storage battery pack 404 is shown connected directly to the DC bus. The voltage on the DC bus may be controlled by the voltage across the battery pack or the voltage output of the microturbines may be increased above the voltage of the battery so that the battery can be recharged or switched to standby. The alternator/rectifier apparatuses of the microturbines may all contain blocking diodes to prevent reverse power flow from the DC bus when the DC output voltage of a particular microturbine is less than the voltage across the DC bus. As can be seen, the voltage across bus is established by the microturbine system or systems with the highest DC output voltage to the bus. Microturbine systems with lower output DC voltages than that across the bus will not provide power to the bus and will not receive power from the bus because of the blocking diodes contained in the alternator/rectifier apparatuses. Thus, by controlling the output voltage of any microturbine system using its particular excitation current, that microturbine system can be brought on-line to supply power to the DC bus. In this example, the bus supplies power to a single inverter apparatus 405 which controls the level of AC power to an AC motor 407. The bus provides a power capacity at a predetermined voltage and the inverter 405 controls the current flow, and hence the power level to the motor 407. As can be appreciated, the battery pack can be brought on line to supply power to the bus by decreasing the bus voltage to match the output voltage of the battery pack. Alternately, all the microturbines can be turned off and the locomotive operated on battery power to move to, for example, into a maintenance shed or pass though a tunnel where emissions are not permitted.

Figure 5:
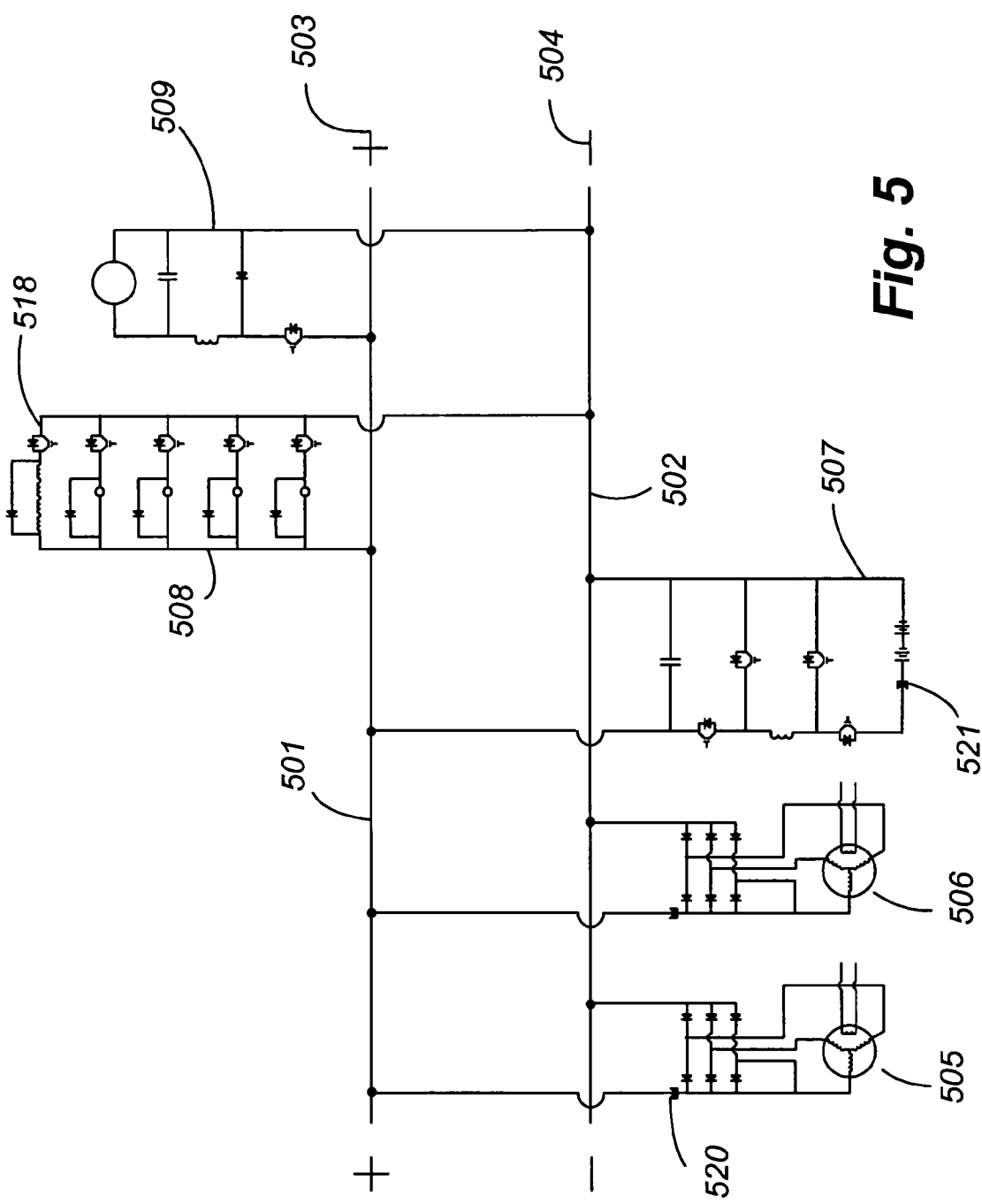
FIG. 5 is a circuit diagram of two diesel engine systems and a battery pack driving four DC traction motors and an auxiliary power supply.

FIG. 5 is a circuit diagram of two diesel power supplies and a battery pack driving four DC traction motors and an auxiliary power supply from a DC common bus. A first diesel alternator/rectifier circuit 505 is shown connected across a bus formed by conductors 501 and 502. An excitation current for the first diesel alternator/rectifier circuit 505 is used to control the voltage output across the bus 501 and 502. A first current sensor 520 monitors the output current from the first diesel alternator/rectifier circuit 505. A second diesel alternator/rectifier circuit 506 is shown connected across the bus formed by conductors 501 and 502. An excitation current for the second diesel alternator/rectifier circuit 506 controls the voltage output across the bus 501 and 502. A second current sensor monitors the output current from the second diesel alternator/rectifier circuit 506. A battery pack and buck/boost circuit 507 is shown connected across the bus formed by conductors 501 and 502. The voltage applied across the bus 501 and 502 by the battery pack is shown controlled by a system of IGBTs which are further discussed in FIG. 7. A third current sensor 521 monitors the output current from the battery pack. The bus 501 and 502 supplies power to four traction motor circuits 508 where the current and power to each traction motor is controlled by its own chopper circuit. In this example, a separately controlled excitation circuit 518 is shown for providing current to the four field coils of the traction motors. The bus 501 and 502 also supplies power to an auxiliary power supply 509 typically through a voltage step down circuit which is further discussed in FIG. 9. Although not illustrated in this figure, the circuit architecture can readily support the DC traction motors being operated as generators in a braking mode and used to charge the battery pack as described in U.S. Provisional Patent Application 60/600,330 which was previously incorporated herein by reference. As can be seen, the DC traction motors operated as generators would not supply power to the diesel systems because of blocking diodes in circuits 505 and 506.

The locomotive represented in FIG. 5 may have a total power output in the range of about 300 kW (typical of an underground locomotive) to about 6,000 kW (a large, long haul railway locomotive). As an example, the power output of each of the two diesel engines may be about one third of the total locomotive power and the battery pack may have the ability to generate approximately four times the peak power as one of the diesel engines. As can be appreciated, such a locomotive would be battery-dominant in which the power output capability of the battery pack is substantially greater than the combined power output of the diesel engines. Such a locomotive may have application for example as a yard switcher. Another configuration may utilize a battery pack with an output power approximately equivalent to the power output of two diesel engines. In this configuration, the diesel engines and battery pack may be operated together for acceleration and ascending grades. The battery pack may be used for recovering energy from a regenerative braking system. Such a locomotive may have application for example as a commuter locomotive or road switcher locomotive. Another configuration may be utilized with a power output capability of the diesel engines substantially greater than the power output of the battery pack. As can also be appreciated the diesels engines may be replaced by gas turbine engines and the like or combinations of diesels and gas turbines. The battery pack may be replaced by a capacitor bank, a flywheel system of a combination of energy storage units.

Figure 6:
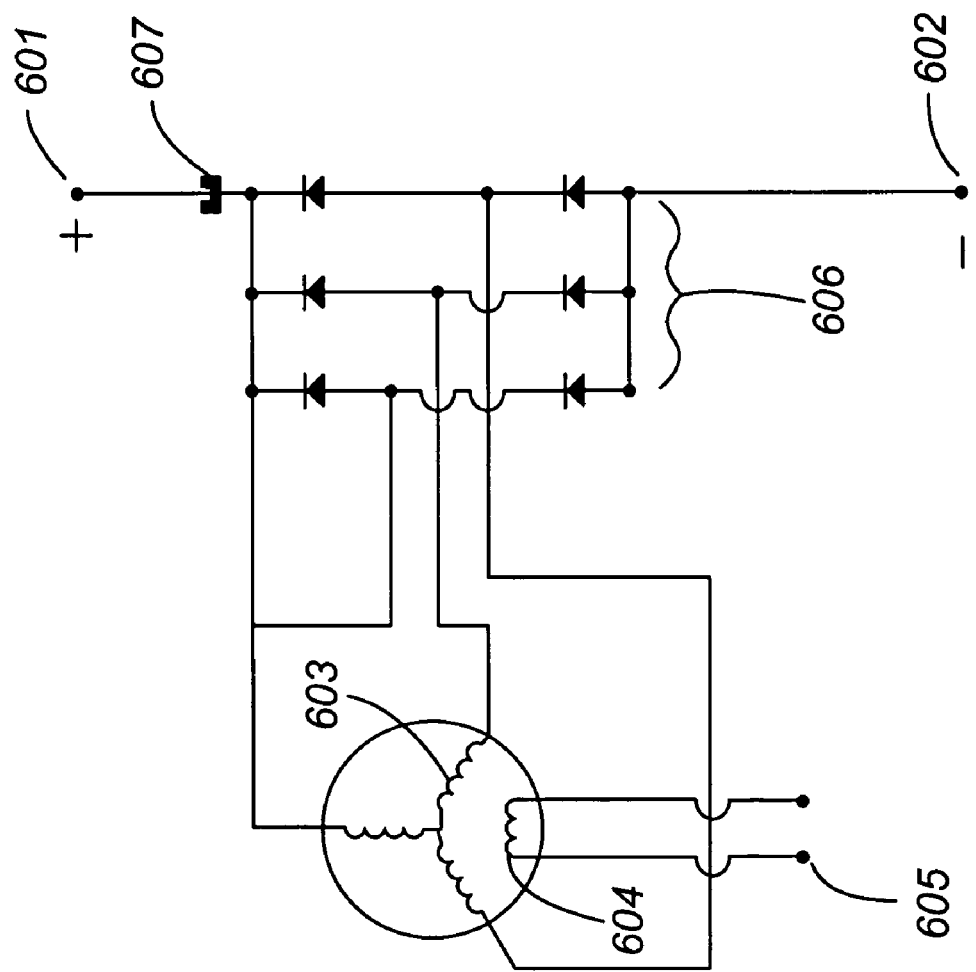
FIG. 6 is a more detailed circuit diagram of an alternator/rectifier that is part of FIG. 5.

FIG. 6 is a more detailed circuit diagram of an alternator/rectifier that is part of FIG. 5. This circuit is connected to the positive terminal of the DC bus by terminal 601 and to the negative terminal of the bus by terminal 602. The current out of the alternator/rectifier circuit is monitored by a current sensor 607. The shaft power of a diesel or gas turbine engine causes a stator 603 to generate an alternating current which is rectified by power diodes 606. The rectified power is then fed to the DC bus. The output of the stator 603 is controlled by an independently controlled exciter coil 604 which receives its input from a computer control system via terminals 605.

Figure 7:
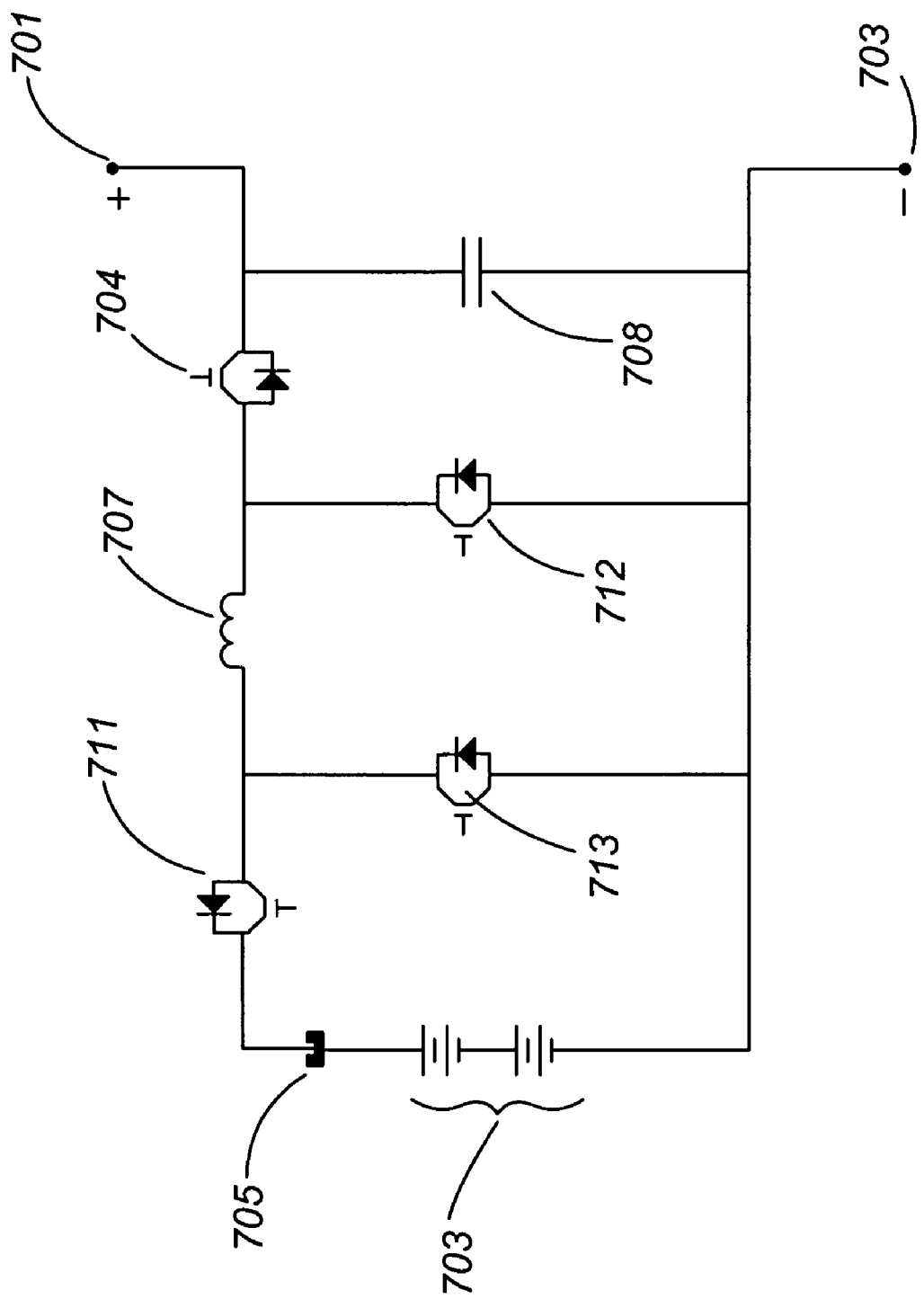
FIG. 7 is a more detailed circuit diagram of a battery pack and buck/boost apparatus that is part of FIG. 5.

FIG. 7 is a more detailed circuit diagram of a battery pack and buck/boost apparatus that is part of FIG. 5. This circuit is connected to the positive terminal of the DC bus by terminal 701 and to the negative terminal of the bus by terminal 702. In the case of a battery pack 703, the current out of the battery pack is monitored by a current sensor 705. As the state-of-charge ("SOC") of battery pack 703 changes, the voltage output to terminals 701 and 702 by the battery pack 703 can be adjusted up or down to allow control of the power from the battery pack to the bus. This voltage control may be provided for example by a buck/boost circuit such as shown in FIG. 7. This is one of several possible configurations for a buck boost circuit and is suitable for high-power applications where power is required to flow from the battery pack to the DC bus or from the DC bus to the battery pack during charging by either one or more engines or a regenerative braking system. In this example, the buck/boost circuit is comprised of an inductor 707, a capacitor 708, IGBTs 704, 711, 712 and 713. For boost (step-up), IGBT 711 is closed, and the amount of boost is controlled by opening and closing IGBT 712. Output voltage across 701 and 702 increases over that across battery pack 703. For buck (step-down), IGBT 711 is opened and closed. When IGBT 711 is open, the current in inductor 707 free wheels through the diode in IGBT 713. Depending on the relative values of the components and time that the IGBTs 711 and 712 are open and closed, the magnitude of the output voltage will be greater or less than the battery pack source voltage. As can be appreciated, the battery pack 703 can be replaced by an active power supply such as for example a fuel cell or another energy storage system such as for example a capacitor bank. Other configurations of buck/boost circuits can also be employed. It is also noted that the buck/boost circuit can be eliminated if it is desirable to operate the DC bus voltage by allowing the output voltage of a large battery pack to control the DC bus voltage.

Figure 8:
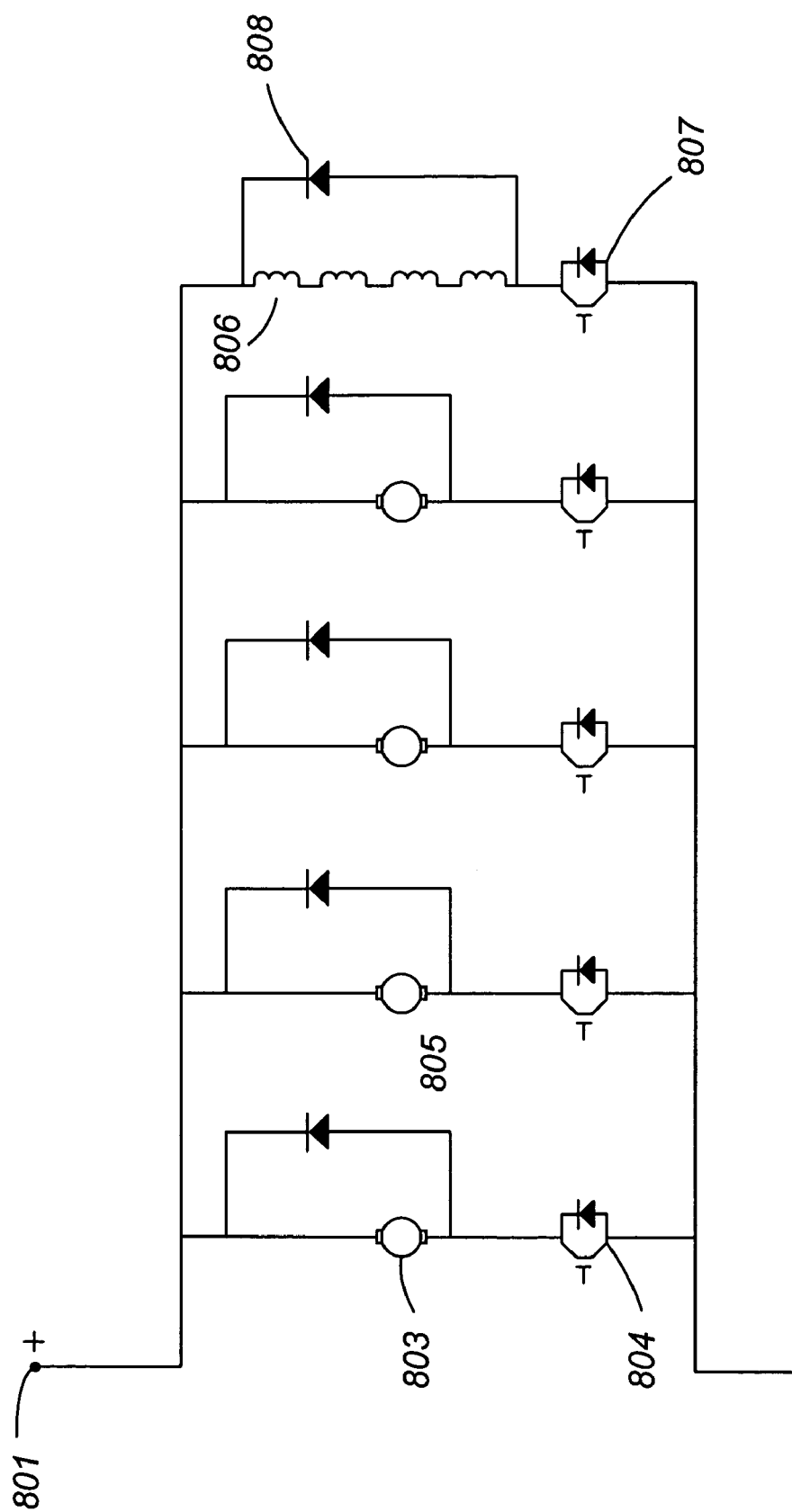
FIG. 8 is a more detailed circuit diagram of a DC traction motor system that is part of FIG. 5.

FIG. 8 is a more detailed circuit diagram of a DC traction motor system that is part of FIG. 5 and illustrates one of a number of possible traction motor circuit configurations. This circuit is connected to the positive terminal of the DC bus by terminal 801 and to the negative terminal of the bus by terminal 802. FIG. 5 shows 4 DC traction motors 803 each with their own IGBT current control switches 804 and free-wheeling diodes 805. In this configuration, the motor field coils 806 are shown as being in parallel with its own IGBT field current control switch 807 and free-wheeling diode 808. As described in U.S. Provisional Patent Application entitled "Regenerative Braking Methods for a Hybrid Locomotive" filed Aug. 9, 2004 which was previously incorporated herein by reference, this method of independently controlling traction motor field coils has a number of advantages. In other well-know configurations, the traction motor field coils can be connected in series with the motor windings.

Figure 9:
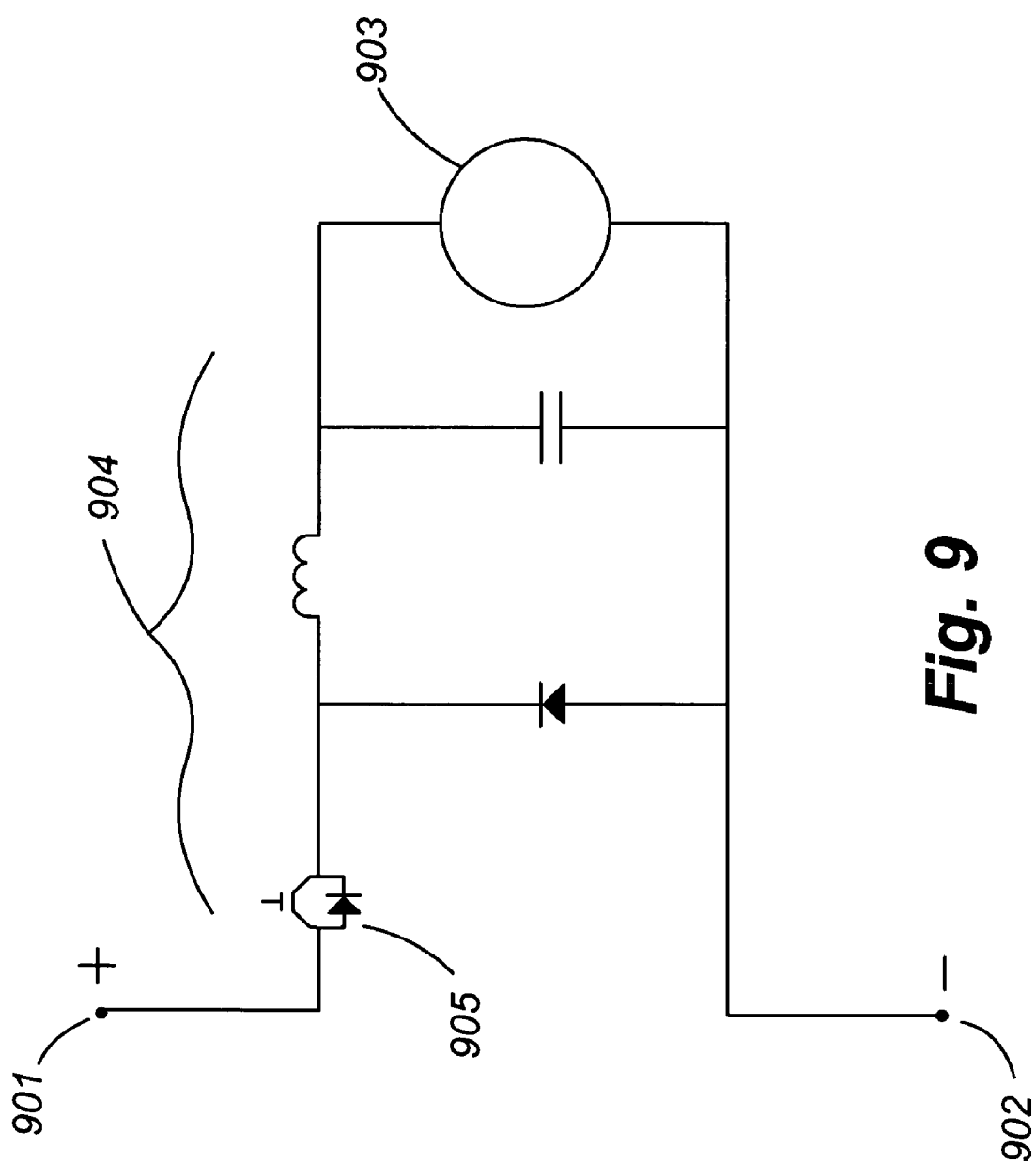
FIG. 9 is a more detailed circuit diagram of an auxiliary power supply that is part of FIG. 5.

FIG. 9 is a more detailed circuit diagram of an auxiliary power supply that is part of FIG. 5. This circuit is connected to the positive terminal of the DC bus by terminal 901 and to the negative terminal of the bus by terminal 902. The auxiliary power supply 903 shown here is an example of a DC power supply that operates at a lower voltage than appears across the DC bus. A buck (step-down) circuit 904 is shown for accomplishing the desired voltage reduction. The buck circuit 904 is shown as controlled, for example, by an IGBT switch 905.

Figure 10:
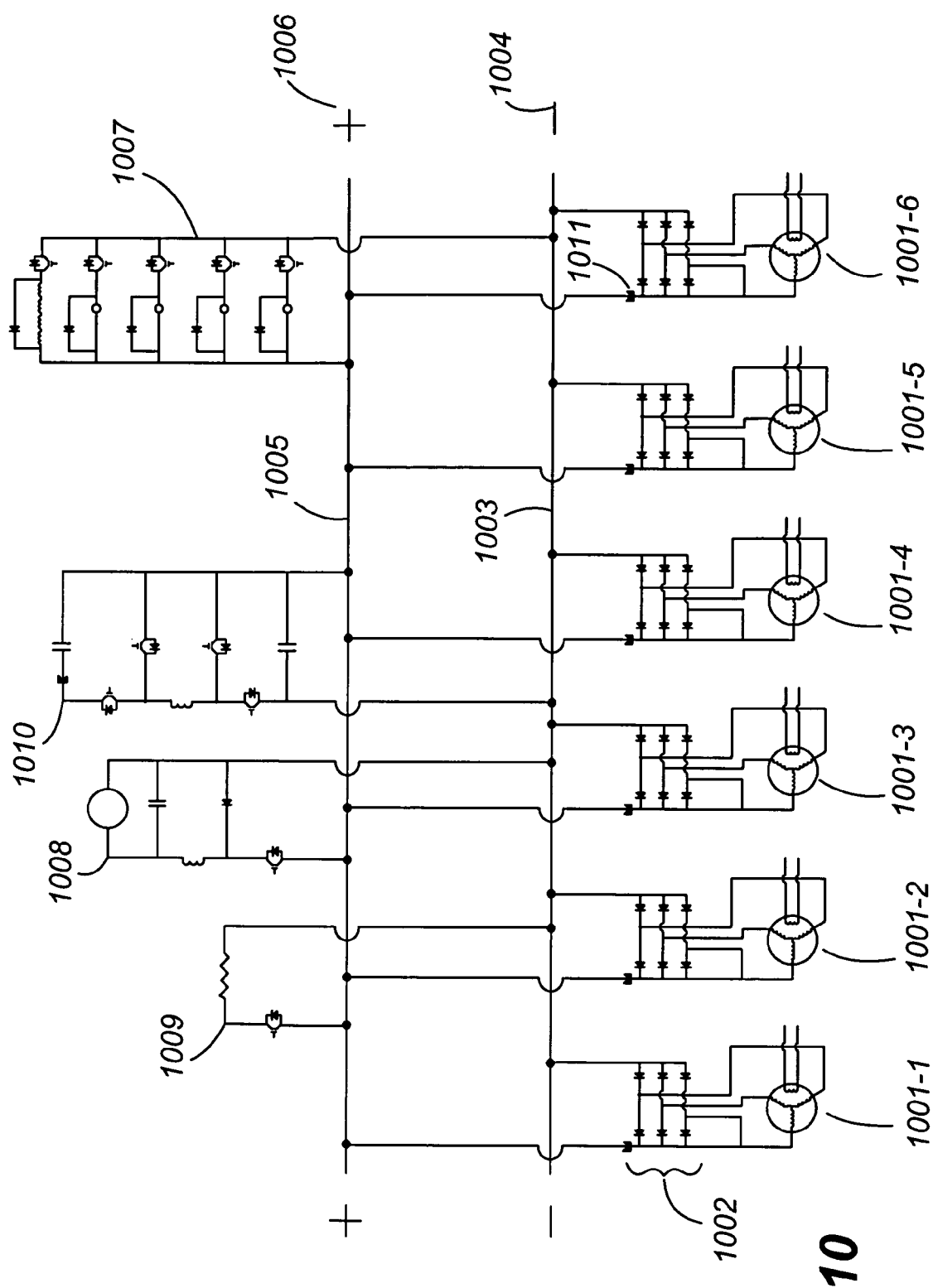
FIG. 10 is a circuit diagram of six diesel engine systems driving four DC traction motors and an auxiliary power supply.

FIG. 10 is an example of an overall electrical schematic of a multi-engine locomotive where six engines are used to provide power to a DC bus which in turn makes power available to an auxiliary power system, an energy storage system and a plurality of traction motors. In this example, the DC bus may also allow power from the traction motors to be dissipated during dynamic braking and/or provide power to an energy storage system which may be used to start one or more of the engines. In the example shown in FIG. 10, the DC bus is shown formed by two conductors 1003 and 1005. Conductor 1003 is the negative side 1004 and conductor 1005 is the positive side 1006. Six alternators 1001 each with rectifying diode networks 1002 are shown connected in parallel to the DC bus. The output DC current from each rectifier 1002 is measured by its own individual current sensor 1011. A propulsion system 1007 comprised of four DC traction motors, each controlled by an individual chopper circuit and common excitation circuit is shown connected to the DC bus in parallel with the engine systems. A typical auxiliary power system 1008 is also shown connected to the DC bus in parallel with the engine systems and propulsion system. A typical dynamic braking system including a dissipating resistive grid 1009 is also shown connected to the DC bus in parallel with the engine systems, propulsion system 1007 and auxiliary power system 1008. FIG. 10 also shows an example of a capacitor energy storage system 1010 connected to the DC bus. Such an energy storage system 1010 may be maintained in a state-of-charge by DC power from one or more of the engines or from power from a dynamic braking system by, for example, a buck/boost circuit. The energy storage system may be used to provide power for starting one or more engines by any of a number of well-known methods. As can be appreciated, the energy storage system can also be a battery pack or a flywheel storage system. A similar electrical architecture for a multi-engine locomotive was disclosed previously in U.S. Provisional Applications 60/607,194 and 60/618,632 entitled "Locomotive Power Train Architecture".

Figure 11:
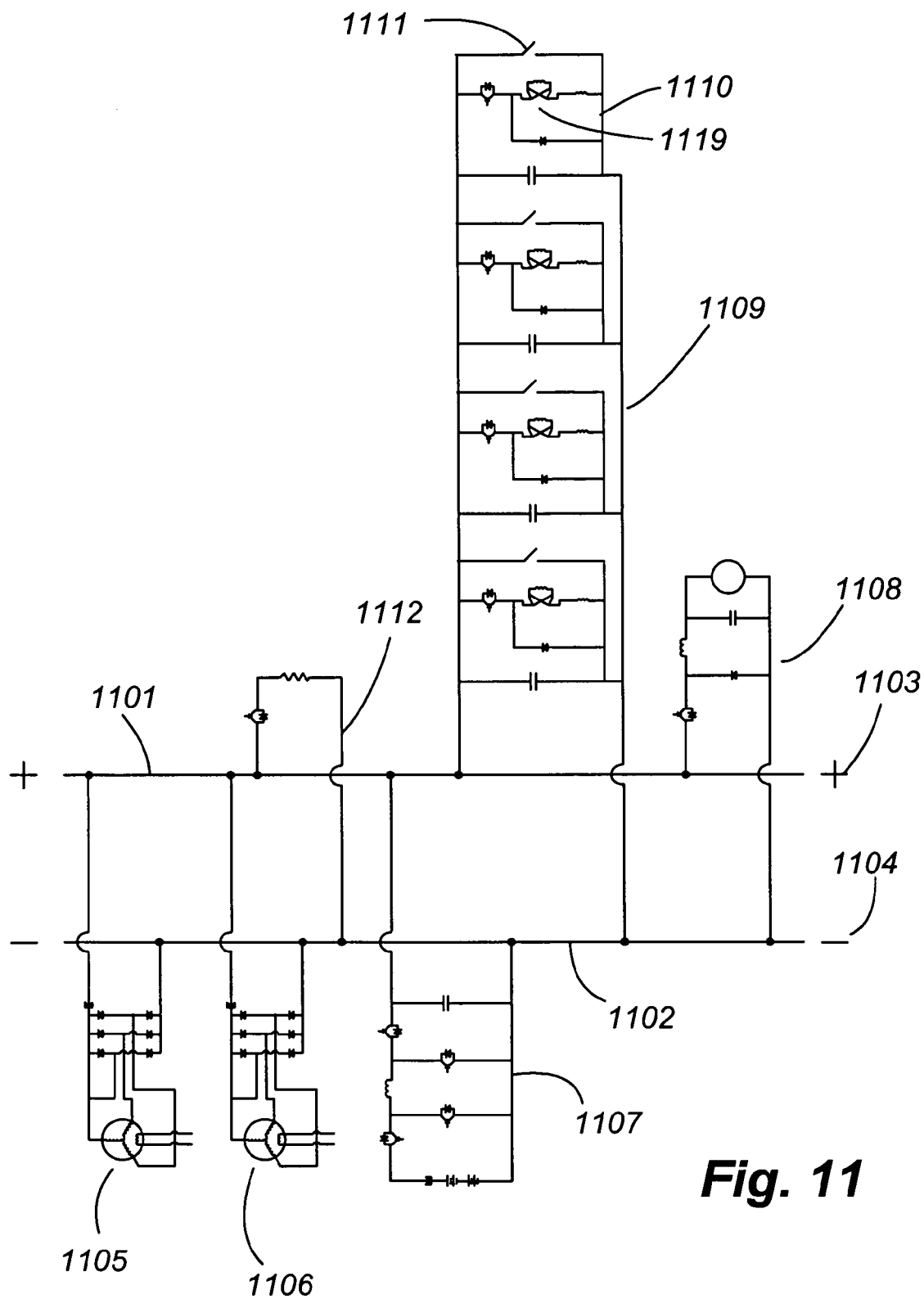
FIG. 11 illustrates the principal power train elements of a hybrid locomotive including a dynamic/regenerative braking system in motoring mode.

FIG. 11 illustrates a simplified electrical architecture of principal power train elements of a hybrid locomotive using a regenerative braking circuit in motoring mode. The regenerative braking system shown is one of several possible configurations. In the system shown in FIG. 11, the inductance of DC traction motor is used to temporarily store energy during braking mode. In this configuration, energy is stored for brief periods in the motor armature and field windings and then discharged to an energy storage system, such as for example a battery pack. The architecture is built around a DC bus comprised of a positive conductor 1101 at a positive voltage 1103 and a negative bus conductor 1102 at a negative voltage 1104. Two alternator/rectifier apparatuses 1105 and 1106, which may be part of diesel and/or gas turbine engines for example, are shown attached to the DC bus along with a battery pack 1107. The battery pack is shown connected to the bus using a buck/boost circuit. The engines and battery pack may be used to provide power to a number of DC traction motors and auxiliary power supplies. FIG. 11 shows an auxiliary power circuit 1108 and a 4 DC traction motor circuits 1109 with regenerative braking capability. In motoring mode, the traction motor switches 1111 are always open and switches 1110 are always closed. Power flows from the generators and/or the battery to the traction motors and to the auxiliary power unit. It is also possible in motoring mode for the generator to provide power for charging the battery pack. A dissipating resistance grid 1112 that is part of a dynamic braking system is also shown. The configuration shown in FIG. 11 might be comprised, for example, of two diesel engines, each with a peak power output in the range of 500 to 700 kW and a battery pack with an energy storage capacity of 500 kW-hrs and peak power output of 500 kW. The four traction motors may be capable of conducting current up to 1,700 amps and developing tractive effort in the range of 80,000 newtons each. The DC bus may be operated in the range of about 400 to 1,100 volts. An example of how such a locomotive might be operated in motoring mode is:

(a) a first diesel is turned on and its output voltage to the DC bus is approximately 700 volts which may be slightly higher than the open circuit voltage of the battery pack.

(b) power is applied to the traction motors as determined by the engineer.

(c) the current output of the diesel and current inputs to each motor may be monitored.

(d) when the motors begin to draw more power than is available from the first diesel engine, the output voltage of the first diesel engine will begin to drop.

(e) a second diesel can be set so that it will come on-line when the output voltage of the first diesel falls below a predetermined set point and the second diesel will remain on until the locomotive power requirement drops below a predetermined level for a predetermined period of time.

(f) if an additional power boost is required, the battery pack can be brought on-line, either by command (which would activate the battery pack boost circuit) or when the DC bus voltage drops below a predetermined set point.

Another example of the configuration shown in FIG. 11 might be two diesel engines, each with a peak power output in the range of 300 kW and a battery pack with an energy storage capacity of 1000 kW-hrs and peak power output of 100 kW. An example of how such a locomotive might be operated in motoring mode might be:

(a) the DC bus voltage is determined by the output of the battery pack (b) power is applied to the traction motors as determined by the engineer when the DC bus voltage falls below a predetermined level, a first diesel is turned on such that its output voltage is approximately that of the original DC bus voltage.

(c) a portion of the applied diesel power will flow back to the battery pack to increase its SOC (d) when the SOC of the battery pack increases beyond a predetermined level, the first diesel is idled or turned off so that it no longer supplies power to the DC bus (e) current output of the diesel and current inputs to each motor may be monitored.

(f) when the motors begin to draw more power than is available from the battery pack and the first diesel engine (for example accelerating while pulling a long train in a switching yard), the output voltage of the DC bus will begin to drop (g) the second diesel can be set so that it will come on-line when the output voltage of the DC bus falls below a predetermined set point and the second diesel will remain on until the locomotive power requirement drops below a predetermined level for a predetermined period of time.

This latter example is typical of how a battery-dominant hybrid locomotive might be operated where the locomotive is operated primarily on battery power for most of the time. From time-to-time, one or more of the diesel engines may be brought on-line to either charge the battery pack or provide an additional power boost. When the DC bus voltage is established by the battery pack, there is typically no need for a buck/boost circuit between the battery pack and the DC bus.

Figure 12:
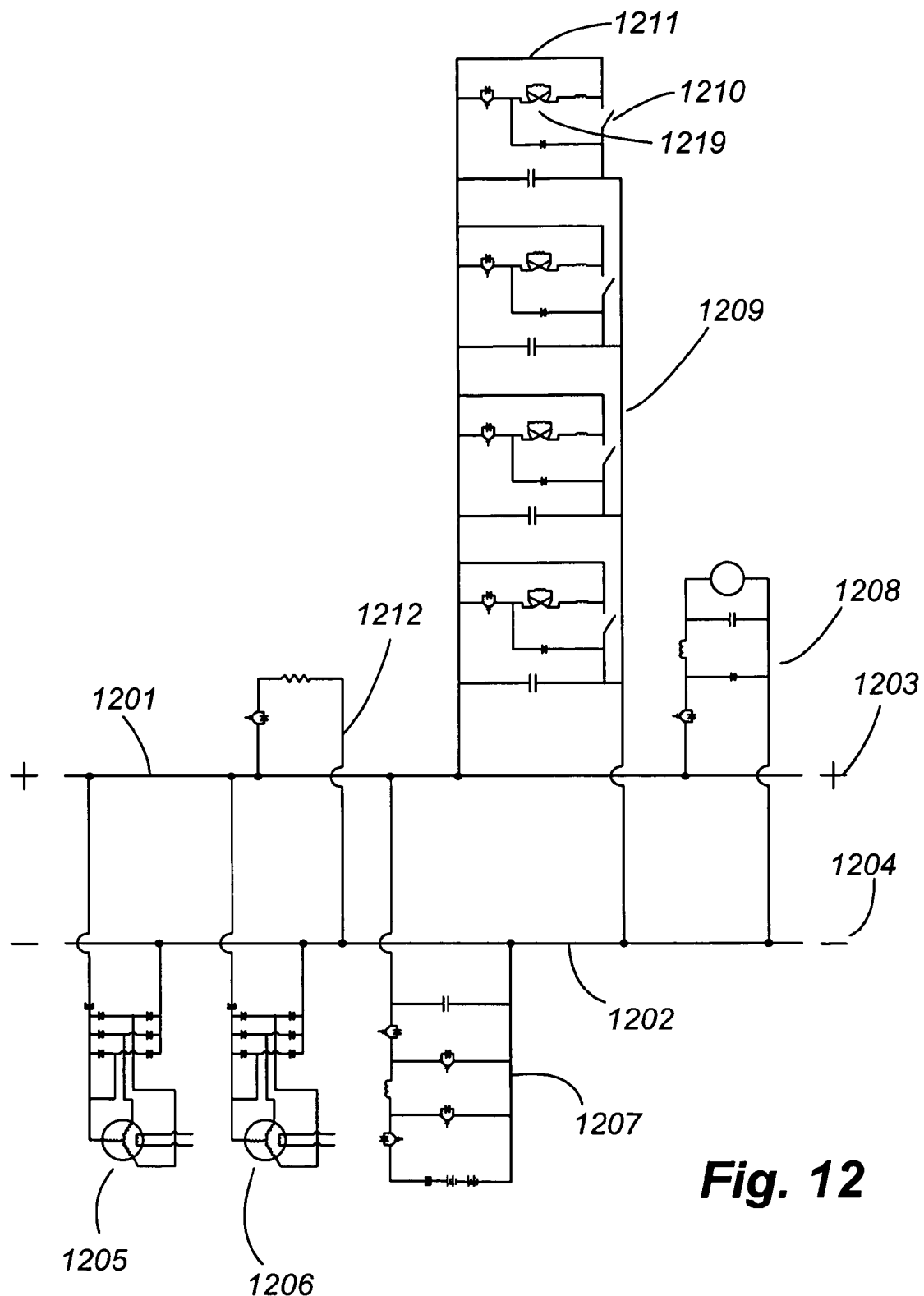
FIG. 12 illustrates the principal power train elements of a hybrid locomotive including a dynamic/regenerative braking system in braking mode.

FIG. 12 illustrates a simplified electrical architecture of principal power train elements of a hybrid locomotive using the regenerative braking circuit of FIG. 11 in braking mode. The architecture is built around a DC bus comprised of a positive conductor 1201 at a positive voltage 1203 and a negative bus conductor 1202 at a negative voltage 1204. Two alternator/rectifier apparatuses 1205 and 1206, which may be part of diesel and/or gas turbine generators for example, are shown attached to the DC bus along with a battery pack 1207. The battery pack is shown connected to the bus using a buck/boost circuit. FIG. 12 shows an auxiliary power circuit 1208 and a 4 DC traction motor circuits 1209 with regenerative braking capability. In braking mode, the traction motor switches 1211 are always closed and switches 1210 are always open. The DC motors, now acting as generators, may provide power for charging the battery pack. As shown in this example, blocking diodes in the alternator/rectifiers prevent power flow back to the generators during braking. If the DC motors now acting as generators provide braking energy at too high a power level to be accommodated by the energy storage battery pack, excess braking energy may be switched to a dissipating resistance grid 1212 so that dynamic braking may continue.

An example of the configuration shown in FIG. 12 might be two diesel engines, each with a peak power output in the range of 2,000 kW and a battery pack with an energy storage capacity of 1,700 kW-hrs and peak power output of 1,700 kW. The four traction motors may be capable of conducting current up to 1,800 amps and developing tractive effort in the range of 80,000 newtons each. The DC bus may be operated at about 700 volts. An example of how such a locomotive might be operated in braking mode is:

(a) upon issuing a braking command, both diesels are taken off-line by reducing their excitation currents such that their output voltages are reduced to less than the DC bus voltage which is now determined by the battery pack which remains at approximately 700 volts.

(b) dynamic braking mode is initiated by setting the appropriate switches on each traction motor circuit (c) the battery pack SOC is determined and, if below a predetermined level, power flowing from the motors, now acting as generators, is allowed to flow into the battery pack (d) the current flowing into the battery pack is monitored (e) if the current to the battery pack exceeds a predetermined limit, power is then switched to the dissipating resistance grid until the current to the battery pack is reduced below a predetermined limit.

(f) if the SOC of the battery pack exceeds a predetermined limit, then all the power from the regenerative braking system is then switched to the dissipating resistance grid.

(g) if the dissipating capacity of the resistance grid is exceeded, then the traction motors are switched back to motoring mode A number of variations and modifications of the invention can be used. It would be possible to provide for some features of the invention without providing others.

For example in one alternative embodiment, multiple gas turbines may be used as power sources. This embodiment would be capable of operating on either liquid natural gas, compressed natural gas or diesel fuel.

In another alternative embodiment, a locomotive may be comprised of a small diesel engine, a battery pack, a capacitor bank and a regenerative braking system. A first function of the capacitor bank would be to temporarily store high power during operation of the regenerative braking system and to transfer it at a lower power level to the battery pack which may have a higher energy storage capacity. The capacitor bank may also provide a second function as a power supply for starting the engine when required.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A motorized off road vehicle, comprising:
   at least one motor;
   a plurality of electrical energy converters operable to convert energy to electrical energy having a desired electrical characteristic, the plurality of electrical energy converters comprising first and second electrical energy converters having respectively first and second output voltages and first and second output currents;
   a plurality of energy sources operable to provide energy to the plurality of electrical energy converters, the plurality of energy sources comprising first and second engines corresponding respectively to the first and second electrical energy converters; and
   a common Direct Current (DC) power bus electrically connecting the plurality of electrical energy converters and the at least one motor and operable to transport electrical energy from the electrical energy converters to the at least one motor, wherein, at a selected time, the relationship between at least one of a current level and a voltage level of the common power bus on the one hand and at least one of the first and second output currents and the first and second output voltages of the first and second electrical energy converters on the other hand determine, at a selected point in time, which of the first and second engines supplies energy to the bus through the corresponding electrical energy converter.

2. The off road vehicle of claim 1, wherein the off road vehicle is a locomotive, wherein the at least one motor is at least one traction motor, wherein the plurality of energy sources comprise an energy storage system, wherein each of the first and second engines is one or more of a diesel engine, gas turbine engine, microturbine, Stirling engine, spark ignition engine, and fuel cell, wherein the energy storage system is one or more of a battery pack, a bank of capacitors, a compressed air storage system and a bank of flywheels, and further comprising:

at least one power control apparatus operable to control electrical energy supplied to the at least one motor, the at least one power control apparatus being positioned between the DC bus and the at least one motor.

3. The off road vehicle of claim 2, wherein the plurality of electrical energy converters include one or more of an alternator-rectifier, a rectifier, a boost circuit, a buck circuit and a buck/boost circuit, wherein the at least one power control apparatus is one or more of an inverter and a chopper circuit and wherein the at least one traction motor is a plurality of traction motors, wherein the at least one motor is a plurality of traction motors and the plurality of traction motors comprise a plurality of an AC induction motor, DC motor, permanent magnet motor and/or switched reluctance motor, wherein the first and second energy converters each comprise an alternator, and wherein the first and second output voltages are the output voltages of the corresponding alternator.

4. The off road vehicle of claim 2, wherein each of first and second electrical energy converters comprises a switch that prevents reverse energy flow from the DC bus to the corresponding engine but allows energy to flow therethrough from the corresponding engine to the DC bus, wherein the energy storage system comprises an output power control apparatus, wherein, in a first mode, an output voltage of the output power control apparatus is less than the DC bus voltage and, in a second mode, the output voltage of the output power control apparatus is at least the DC bus voltage, and wherein, in the first mode, the energy storage system receives energy from the DC bus for storage and, in the second mode, the energy storage provides energy to the DC bus from storage.

5. The off road vehicle of claim 1, wherein, in a first mode, the first output voltage is higher than the second output voltage and is at least the DC bus voltage and wherein the second output voltage is lower than the DC bus voltage, whereby the first engine but not the second engine provides energy to the DC bus through the corresponding electrical energy converter and wherein, in a second mode, the first and second output voltages are each at least the DC bus voltage, whereby both of the first and second engines provide electrical energy to the DC bus through the first and second electrical energy converters.

6. The off road vehicle of claim 5, wherein the desired electrical characteristic is at least one of a voltage and power and wherein the first and second output voltages are controlled by varying an excitation current applied to the corresponding electrical energy converter.

7. The off road vehicle of claim 5, wherein the DC bus voltage is maintained substantially constant in the first and second modes.

8. The off road vehicle of claim 5, wherein the DC bus voltage is varied in the first and second modes.

9. The off road vehicle of claim 8, wherein the DC bus voltage is allowed to vary in accordance with load power demand.

10. The off road vehicle of claim 2, wherein the DC bus voltage is allowed to vary in response to fluctuations in the output voltage of the energy storage system and/or power control apparatus.

11. The off road vehicle of claim 1, wherein each of the electrical energy converters includes an excitation circuit, the excitation circuit being operable to control the output voltage of the corresponding energy converter and thereby control when energy provided by the corresponding energy source is transported on the bus.

12. The off road vehicle of claim 9, wherein, as the at least one motor requires greater amounts of electrical energy, the bus voltage level decreases, thereby permitting at least some of the energy sources having lower output voltages to provide electrical energy to the bus.

13. The off road vehicle of claim 1, wherein at least three of the plurality of energy sources are engines, wherein each engine operates in a motoring mode in which the engine supplies energy to the bus through the corresponding electrical energy converter, an idling mode in which the engine is idling and not supplying energy to the bus through the corresponding electrical energy converter, and a down mode in which the engine is turned off, and wherein at a selected time, the first engine is in the motoring mode, the second engine is in the idling mode, and a third engine is in the down mode.

14. The off road vehicle of claim 1, wherein the power output of the first and second engines has a frequency component, and wherein, during a time when the first and second engines are operational, the frequency components are asynchronous.

15. The off road vehicle of claim 1, wherein the first engine is operating at a first revolutions per minute, wherein the second engine is operating at a second revolutions per minute, wherein the first revolutions per minute is less than the second revolutions per minute, and wherein the first and second output voltages of the first and second energy converters, corresponding respectively to the first and second engines, are approximately equal to the bus voltage.

16. The off road vehicle of claim 1, wherein the DC bus comprises first and second conductors having opposing polarities, wherein each of the plurality of electrical energy converters and the at least one motor are connected in parallel across the first and second conductors.

17. In an off road vehicle comprising at least one motor, a plurality of electrical energy converters operable to convert energy to electrical energy having a desired electrical characteristic, a plurality of energy sources operable to provide energy to the plurality of electrical energy converters, and a common Direct Current (DC) power bus electrically connecting the plurality of electrical energy converters and the at least one motor and operable to transport electrical energy from the electrical energy converters to the at least one motor, a method comprising:

at a first selected time, implementing a first set of relationships between a voltage level of the common power bus on the one hand and output voltages of the electrical energy converters on the other, whereby a first set of the energy sources provides energy to the common power bus; and at a second selected time, implementing a second set of relationships between the voltage level of the common power bus on the one hand and output voltages of the electrical energy converters on the other, whereby a second set of energy sources provides energy to the common power bus, wherein the memberships of the first and second sets of energy sources are different.

18. The method of claim 17, wherein a first energy converter has a first output voltage and wherein the first energy converter has a second output voltage, wherein the first and second output voltages are different, and wherein, in the first set of relationships, the first output voltage is at least the common bus voltage and, in the second set of relationships, is less than the common bus voltage.

19. The method of claim 18, wherein the output voltage of the first energy converter is varied between the first and second output voltages by varying an excitation current applied to the first energy converter.

20. The method of claim 18, wherein the magnitudes of the common bus voltage at the first and second selected times are substantially the same.

21. The method of claim 17, wherein, at the first selected time, a first energy converter has a first output voltage and the power bus a first bus voltage and wherein, at the second selected time, the first energy converter has a second output voltage and the power bus a second bus voltage, wherein the first and second output voltages are substantially the same and the first and second bus voltages are different, and wherein, in the first set of relationships, the first output voltage is at least the first voltage at the first selected time and, in the second set of relationships, the second output voltage is less than the second bus voltage at the second selected tune.

22. The method of claim 21, wherein the bus voltage varies between the first and second selected times in response to load power demand.

23. The method of claim 21, wherein the bus voltage varies between the first and second selected times in response to an output voltage of an energy storage system.

24. The method of claim 17, wherein the plurality of electrical energy converters comprises first and second electrical energy converters having respectively first and second output voltages, wherein the plurality of energy sources comprises first and second engines corresponding respectively to the first and second electrical energy converters, wherein, in the first and second sets of relationships, the bus voltage on the one hand and the first and second output voltages of the first and second electrical energy converters on the other hand determine, at a selected point in time, which of the first and second engines supplies energy to the bus through the corresponding electrical energy converter.

25. The method of claim 24, wherein the off road vehicle is a locomotive, wherein the at least one motor is at least one traction motor, wherein the plurality of energy sources comprise an energy storage system, wherein each of the first and second engines is one or more of a diesel engine, gas turbine engine, microturbine, Stirling engine, spark ignition engine, and fuel cell, wherein the energy storage system is one or more of a battery pack, a bank of capacitors, a compressed air storage system and a bank of flywheels, and wherein the locomotive comprises at least one power control apparatus operable to control electrical energy supplied to the at least one motor, the at least one power control apparatus being positioned between the DC bus and the at least one motor.

26. The method of claim 25, wherein the plurality of electrical energy converters include one or more of an alternator-rectifier, a rectifier, a boost circuit, a buck circuit and a buck/boost circuit, wherein the at least one power control apparatus is one or more of an inverter and a chopper circuit and wherein the at least one traction motor is a plurality of traction motors, and wherein the at least one motor is a plurality of traction motors and the plurality of traction motors comprise a plurality of an AC induction motor, DC motor, permanent magnet motor and/or switched reluctance motor.

27. The method of claim 25, wherein each of first and second electrical energy converters comprises a switch that prevents reverse energy flow from the DC bus to the corresponding engine but allows energy to flow therethrough from the corresponding engine to the DC bus, wherein the energy storage system comprises an output power control apparatus, wherein, in a first mode, an output voltage of the output power control apparatus is less than the DC bus voltage and, in a second mode, the output voltage of the output power control apparatus is at least the DC bus voltage, and wherein, in the first mode, the energy storage system receives energy from the DC bus for storage and, in the second mode, the energy storage provides energy to the DC bus from storage.

28. The method of claim 24, wherein, in a first mode, the first output voltage is higher than the second output voltage and is at least the DC bus voltage and wherein the second output voltage is lower than the DC bus voltage, whereby the first engine but not the second engine provides energy to the DC bus through the corresponding electrical energy converter and wherein, in a second mode, the first and second output voltages are each at least the DC bus voltage, whereby both of the first and second engines provide electrical energy to the DC bus through the first and second electrical energy converters.

29. The method of claim 17, wherein at least three of the plurality of energy sources are engines, wherein each engine operates in a motoring mode in which the engine supplies energy to the bus through the corresponding electrical energy converter, an idling mode in which the engine is idling and not supplying energy to the bus through the corresponding electrical energy converter, and a down mode in which the engine is turned off, and wherein at a selected time, a first engine is in the motoring mode, a second engine is in the idling mode, and a third engine is in the down mode.

30. The method of claim 21, wherein the power output of each of the first and second engines has a frequency component, wherein, during a time when the first and second engines are operational, the frequency components are unsynchronized, wherein the power outputs for the first and second engines respectively are from the first and second energy converters, wherein the first and second energy converters each comprise a generator, and wherein the generators' speeds are asynchronous.

31. The method of claim 21, wherein the first engine is operating at a first revolutions per minute, wherein the second engine is operating at a second revolutions per minute, wherein the first revolutions per minute is less than the second revolutions per minute, and wherein the first and second output voltages of the first and second energy converters, corresponding respectively to the first and second engines, are approximately equal to the bus voltage.

32. The method of claim 21, wherein DC bus comprises first and second conductors having opposing polarities, wherein each of the plurality of electrical energy converters and the at least one motor are connected in parallel across the first and second conductors.

33. A method for operating a locomotive, the locomotive including at least one traction motor, at least one power control apparatus controlling electrical energy supplied to the at least one traction motor, a plurality of energy sources providing energy to the at least one traction motor, and at least one electrical energy converter converting the provided energy to electrical energy having a desired electrical characteristic, and a common power bus electrically connecting the at least one power control apparatus and the at least one electrical energy converter, comprising:

during a first time interval, setting a first energy converter corresponding to a first energy source to a first output voltage, the first output voltage being equal to a bus voltage;

during the first time interval, setting a second energy converter corresponding to a second energy source to a second output voltage, the second output voltage being less than the first output voltage; and during the first time interval, the first energy source but not the second energy source providing energy to the bus for use by the at least one traction motor.

34. The method of claim 33, further comprising, during a second time interval:

increasing an excitation voltage to the second energy converter to provide a third output voltage, the third output voltage being approximately equal to the bus voltage; and the second energy source providing energy to the bus for use by the at least one traction motor.

35. The method of claim 33, further comprising:

when a selected output voltage is less than the bus voltage, preventing electrical energy from flowing to the corresponding energy source.

36. The method of claim 33, further comprising:

an excitation circuit controlling the output voltage of a selected energy converter and thereby controlling when energy is provided by the corresponding energy source to the bus.

37. The method of claim 33, further comprising:

the bus voltage level decreasing as the at least one traction motor requires increasing amounts of electrical energy, thereby permitting at least some of the energy sources having lower output voltages to provide electrical energy to the bus.

38. The method of claim 33, wherein the plurality of energy sources comprises first, second, and third engines connected to the bus through corresponding electrical energy converters and further comprising during a second time interval:

the first engine supplying energy to the bus through the corresponding electrical energy converter;

the second engine idling and not supplying energy to the bus; and the third engine being deactivated and not supplying energy to the bus.

39. The method of claim 33, wherein the plurality of energy sources comprise first and second engines connected to the bus through first and second electrical energy converters, wherein the power output of each of the first and second engines has a frequency component, wherein, during a time when the first and second engines are operational, the frequency components are asynchronous, wherein the power outputs for the first and second engines respectively are from the first and second energy converters, wherein the first and second energy converters each comprise a generator, and wherein the generators speeds are asynchronous.

40. The method of claim 39, further comprising:

operating the first engine at a first revolutions per minute; and operating the second engine at a second revolutions per minute, wherein the first revolutions per minute is less than the second revolutions per minute and wherein the output voltages of first and second energy converters, corresponding respectively to the first and second engines, are approximately equal to the bus voltage.

* * * * *